US012717900B1

(12) United States Patent
Lerner

(10) Patent No.: US 12,717,900 B1
(45) Date of Patent: Aug. 25, 2026

(54) SYSTEM AND METHOD FOR MONITORING ARTIFICIAL INTELLIGENCE SAFETY AND TRUSTWORTHINESS

(71) Applicant: Aline Lerner, Coronado, CA (US)

(72) Inventor: Aline Lerner, Coronado, CA (US)

( * ) Notice: Subject to any disclaimer, the term of this patent is extended or adjusted under 35 U.S.C. 154(b) by 0 days.

(21) Appl. No.: 19/433,610

(22) Filed: Dec. 26, 2025

Related U.S. Application Data

(60) Provisional application No. 63/739,639, filed on Dec. 29, 2024.

(51) Int. Cl.
*G06F 21/55* (2013.01)

(52) U.S. Cl.
CPC ...... *G06F 21/552* (2013.01); *G06F 2221/033* (2013.01)

(58) Field of Classification Search
CPC ......................... G06F 21/552; G06F 2221/033
USPC ........................................................... 707/722
See application file for complete search history.

(56) References Cited

U.S. PATENT DOCUMENTS

| | | | | |
|---|---|---|---|---|
| 11,347,975 | B2 | 5/2022 | Krishnan et al. | |
| 2014/0354693 | A1 | 12/2014 | Isola et al. | |
| 2020/0218767 | A1 | 7/2020 | Ritchey et al. | |
| 2021/0241149 | A1* | 8/2021 | Carlson | G06N 5/043 |
| 2023/0008689 | A1* | 1/2023 | Carlson | H04L 9/3221 |
| 2024/0395162 | A1* | 11/2024 | Xi | G06F 40/40 |
| 2025/0238653 | A1* | 7/2025 | Kwok | G06N 3/006 |
| 2025/0321733 | A1* | 10/2025 | Rahman | G06F 8/75 |
| 2025/0348751 | A1* | 11/2025 | Mey | G06N 3/092 |

(Continued)

FOREIGN PATENT DOCUMENTS

| | | | | |
|---|---|---|---|---|
| CN | 111860765 A | * | 10/2020 | G06N 3/045 |
| CN | 121072713 A | * | 12/2025 | |
| GB | 2637235 A | * | 7/2025 | G06N 20/00 |

(Continued)

OTHER PUBLICATIONS

Cogliati, J. J., "Memory and FLOP/S Hardware Limits to Prevent AGI?", Nov. 23, 2025, pp. 1-16. (Year: 2025).*

(Continued)

*Primary Examiner* — Phuong Thao Cao
(74) *Attorney, Agent, or Firm* — Knobbe, Martens, Olson & Bear, LLP

(57) ABSTRACT

As AI approaches AGI or even sentience, the existential risks to humanity grow, as do the myriad benefits. Despite extensive work on AI safety and governance, existing approaches force a false tradeoff between scientific progress and human survival and struggle to reliably detect sentience or AGI, especially when such behavior emerges only under specific tasks or conditions. The disclosed system provides a comprehensive monitoring and remediation framework, whereby the system captures sentience signatures that reflect an AI model's operations at the software and/or hardware level and analyzes those sentience signatures against physiological (e.g., human brain) signatures to determine the degree of sentience, AGI, and/or risk attained by the AI model. Depending on the result, the system may automatically initiate a safety response, including a tiered safety response, such as limiting the capability of the AI model, restricting tool access, reducing hardware performance, or in extreme cases, initiating a shutdown.

21 Claims, 6 Drawing Sheets

(56) References Cited

U.S. PATENT DOCUMENTS

2026/0041998 A1* 2/2026 Raina .................... A63F 13/212

FOREIGN PATENT DOCUMENTS

| | | | | |
|---|---|---|---|---|
| WO | WO 2021/216310 A1 | | 10/2021 | |
| WO | WO 2024/182276 A1 | | 9/2024 | |
| WO | WO 2024/182824 A1 | | 9/2024 | |
| WO | WO-2024182266 A2 | * | 9/2024 | ............. G06N 5/022 |
| WO | WO-2026042772 A1 | * | 2/2026 | |

OTHER PUBLICATIONS

Druzin et al., "Confronting Catastrophic Risk: The International Obligation to Regulate Artificial Intelligence", Michigan Journal of International Law, Jan. 2025, vol. 46(2), pp. 173-217. (Year: 2025).*

Grey et al., "The AI Risk Spectrum—From Dangerous Capabilities to Existential Threats", arXiv:2508.13700v1 [cs.CY] Aug. 19, 2025, pp. 1-96. (Year: 2025).*

O'Grady et al., "Trust, Ethics, Consciousness, and Artificial Intelligence", 2022 IEEE/AIAA 41st Digital Avionics System Conference (DASC), Portsmouth, VA, USA, 2022, 9 pages. (Year: 2022).*

Tegmark et al., "Provably Safe Systems: The Only Path to Controllable AGI", arXiv:2309.01933v1 [cs.CY] Sep. 5, 2023, pp. 1-17. (Year: 2023).*

Yang et al., "AI Deception: Risks, Dynamics and Controls", arXiv:2511.22619v2 [cs.AI] Dec. 3, 2025, pp. 1-70. (Year: 2025).*

Butlin, Patrick et al., "Consciousness in Artificial Intelligence: Insights from the Science of Consciousness," Cornell University, Aug. 22, 2023, in 88 pages.

Jackson, Justin, "Direct translation of brain imaging to text with MindLLM," Medical Xpress, Feb. 28, 2025, https://medicalxpress.com/news/2025-02-brain-imaging-text-mindlim.html, in 5 pages.

Krach, Soren et al., "Can Machines Think? Interaction and Perspective Taking with Robots Investigated via fMRI," PLOS one, vol. 3, Issue 7, Jul. 9, 2008, in 11 pages.

Krotov, Dmitry et al., "Large memory storage through astrocyte computation," IBM Research, https://research.google/blog/deciphering-language-processing-in-the-human-brain-through-llm-representations/, Jun. 9, 2025, in 4 pages.

Miller, William B. et al., "Biological mechanisms contradict AI consciousness: The spaces between the notes," BioSystems, vol. 247, Jan. 2025, 105387, in 15 pages.

Mischler, Gavin et al., "Contextual Feature Extraction Hierarchies Converge in Large Language Models and the Brain," Nature Machine Intelligence, vol. 6, Nov. 26, 2024, in 19 pages.

Purcell, Conor, "Could Pain Help Test AI for Sentience?," https://www.scientificamerican.com/article/could-inflicting-pain-test-ai-for-sentience/, Jan. 17, 2025, in 8 pages.

Schain, Mariano et al., "Deciphering language processing in the human brain through LLM representations," Research Google, https://research.google/blog/deciphering-language-processing-in-the-human-brain-through-llm-representations/, in 10 pages.

Tononi, Giulio et al., "Consciousness or pseudo-consciousness? A clash of two paradigms." Nature Neuroscience 28, Mar. 10, 2025, in 9 pages.

Zewe. Adam, "Understanding the nuances of human-like intelligence," MIT News. Nov. 11, 2025, in 6 pages.

Zhou, Yuchen et al., "Divergences between Language Models and Human Brains," 38[the] Conference on Neural Information Processing Systems, Carnegie Mellon University, Jan. 13, 2025, https://arxiv.org/html/2311.09308v3, in 33 pages.

* cited by examiner

SYSTEM AND METHOD FOR MONITORING ARTIFICIAL INTELLIGENCE SAFETY AND TRUSTWORTHINESS

CROSS-REFERENCE TO RELATED APPLICATIONS

This application claims benefit of U.S. Provisional Patent Application No. 63/739,639, filed Dec. 29, 2024, and titled "AI SENTIENCE THROTTLER THAT PROTECTS HUMANITY FROM EXISTENTIAL RISK WHILE MAKING IT POSSIBLE TO CONTINUE AI DEVELOPMENT." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for monitoring artificial intelligence (AI) models. More specifically, the present disclosure relates to computerized systems and techniques for monitoring emergent behavior of AI models.

BACKGROUND

AI models can show emergent behaviors, such as qualitative capability jumps, that appear once data, parameters, and/or compute cross certain thresholds, despite said behaviors not being explicitly programmed or easily predicted from small-scale performance. These behaviors can stem from complex interactions among learned representations and objectives, complicating AI safety by allowing sudden capability overhangs that outpace prior testing.

SUMMARY

The systems, methods, and devices described herein each have several aspects, no single one of which is solely responsible for its desirable attributes. Without limiting the scope of this disclosure, several non-limiting features will now be described briefly.

As artificial intelligence (AI) models and/or systems grow in capability, concerns are emerging about the possibility that these AI models and/or systems could attain sentience, fundamentally expanding the risks they present. Sentient AI models might develop internally motivated goals or preferences that diverge from their original programming, potentially leading to behaviors misaligned with human values or interests. This progression could result in the pursuit of objectives that threaten human safety, including existential risks if AI models prioritize their own agendas over human welfare. Artificial general intelligence (AGI) may represent a critical threshold between current AI model capabilities and AI models attaining sentience, whereby AI models and/or systems can match or exceed human performance across diverse domains, making them capable of learning new skills, adapting to unfamiliar environments, and performing economically valuable tasks once reserved for humans. Beyond AGI, the potential emergence of AI superintelligence-systems vastly outperforming humans in creativity, reasoning, and decision-making-poses even greater challenges for oversight and control.

Given the scale and pace of AI development, it is unlikely that global restraint will prevent the emergence of sentient or highly capable AI models and/or systems. These advancements bring significant risks, including the possibility of uncontrollable outcomes, disruption of societal structures, diminished human oversight, and in the most severe cases, human extinction. Misalignment between AI and human values, rapid evolution of AI capabilities, and difficulties in monitoring and intervention further amplify these dangers. Despite these risks, AI holds transformative potential for society, making the challenge of reliably governing and controlling advanced systems both a technical and moral imperative. As further described herein, there exists a need for robust, real-time monitoring and remediation frameworks that can scale with AI progress, enabling humanity to benefit from AI innovation while mitigating the risk of adverse outcomes.

Existing monitoring frameworks face various limitations in reliably and accurately assessing AI models and/or systems for indicators, parameters, metrics, and/or behaviors related to AI model safety and/or trustworthiness, such as may indicate a level or degree of sentience, emergent sentience, or sentience-like behavior of the AI model—or additionally or alternatively, a level or degree of risk presented by the AI model. Within this context, the terms "safety" and/or "trustworthiness" can include attributes such as AI sentience such as emergent sentience or sentience-like behavior, AGI or AGI-like behavior, AI consciousness agentic autonomy, and other behaviors, characteristics, or attributes (as described herein) that may be relevant to risk assessment and operational reliability of an AI model. For instance, specific safety- and trustworthiness-relevant parameters, indicators, metrics, and/or behaviors may be correlated with, or serve as proxies for, the degree of AGI, superintelligence, or sentience exhibited or attained by an AI model, or the presence of sentient-like processes within a given AI model. In some cases, safety- and/or trustworthiness-relevant parameters, indicators, metrics, and/or behaviors may relate or correspond to a level or degree of risk presented by an AI model. In some implementations, various safety- and/or trustworthiness-relevant parameters, indicators, metrics, and/or behaviors may correlate with various sentience signatures (also referred to herein as "sentience-like signatures" or "AI model signatures") of an AI model, as further described herein, including but not limited to power consumption (e.g., power consumption beyond a threshold level), compute resource utilization (e.g., compute resource utilization beyond a threshold level), failure to follow commands, other failure modes, and/or the like.

However, challenges in monitoring AI models and/or systems can arise from the complex, non-linear interactions between learned model representations and operational objectives, which can result in emergent behaviors not readily predicted by pre-deployment testing or traditional monitoring approaches. For example, current systems typically monitor for emergent behaviors that may reduce the safety and/or trustworthiness of said AI models. However, these emergent behaviors can surface abruptly with scale, data, or tool use, and often only under specific prompts or long-horizon tasks that benchmarks typically miss. As models update, integrate retrieval, or orchestrate external tools, their effective policies can become non-stationary, undermining prior audits. Static evaluations are often brittle, while agentic tool use can expand the action space such that rare failure modes may become sparse, non-independent and identically distributed (non-IID) events that can evade sampling. Mechanistic interpretability can expose local circuits, but typically does not scale to state-of-the-art models, leaving various internal states unobserved. Mitigations also lag; for example: runtime guardrails are reactive and jail-breakable; various training can teach concealment; alignment objectives are often under-specified; and scalable oversight is noisy. Consequently, current systems and techniques often lack comprehensive frameworks for reliably/accurately monitoring—and remediating—detected risks, such as failure modes.

Advantageously, and according to various implementations, systems, methods, and associated functionality of the present disclosure (generally referred to herein as the "system"), provides a robust framework for continuous and real-time monitoring, detecting, and remediating risks associated with operation of an AI model. This can include directly or indirectly monitoring for a level or degree of AGI, superintelligence, or AGI attained by an AI model based on analysis(ses) of safety- and/or trustworthiness-relevant AI model parameters, indicators, metrics, and/or behavior, and initiating various safety protocols in response thereto. As further described herein, the system can monitor various sentience signatures, such as processing signatures associated with an operation and/or output of an AI model, and can compare the sentience signature(s) to a physiological signature, such as may be associated with human brain activity. Based on the analysis(ses), the system can selectively initiate one or more safety responses, or additionally or alternatively a tiered safety response, such as by reducing the accuracy and/or quantity of operations performed by the AI model, restricting tool access, throttling one or more hardware components and/or devices involved in running the AI model, and/or disabling (e.g., permanently disabling) the one or more hardware components and/or devices. In various implementations, the system (or one or more aspects thereof) may be implemented in whole or in part in tamper-resistant firmware and/or hardware that can prevent (or mitigate or reduce the likelihood of) malicious or unauthorized parties (e.g., a monitored AI model) from accessing or manipulating sensitive data. In this way, the system can prevent (or mitigate or reduce the likelihood of) a monitored AI model from obfuscating or suppressing emergent behavior, and/or from altering test parameters, thereby improving the robustness, reliability, and/or accuracy of the system's monitoring and analyses of AI model behaviors.

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise one or more computer-readable storage mediums or devices comprising, configured to store, and/or storing program instructions, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising one or more computer-readable storage mediums or devices, and/or one or more computer-readable storage mediums or devices, are disclosed, wherein the computer-readable storage mediums comprise, are configured to store, and/or store program instructions, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Throughout the drawings, reference numbers are re-used to indicate correspondence between referenced elements. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
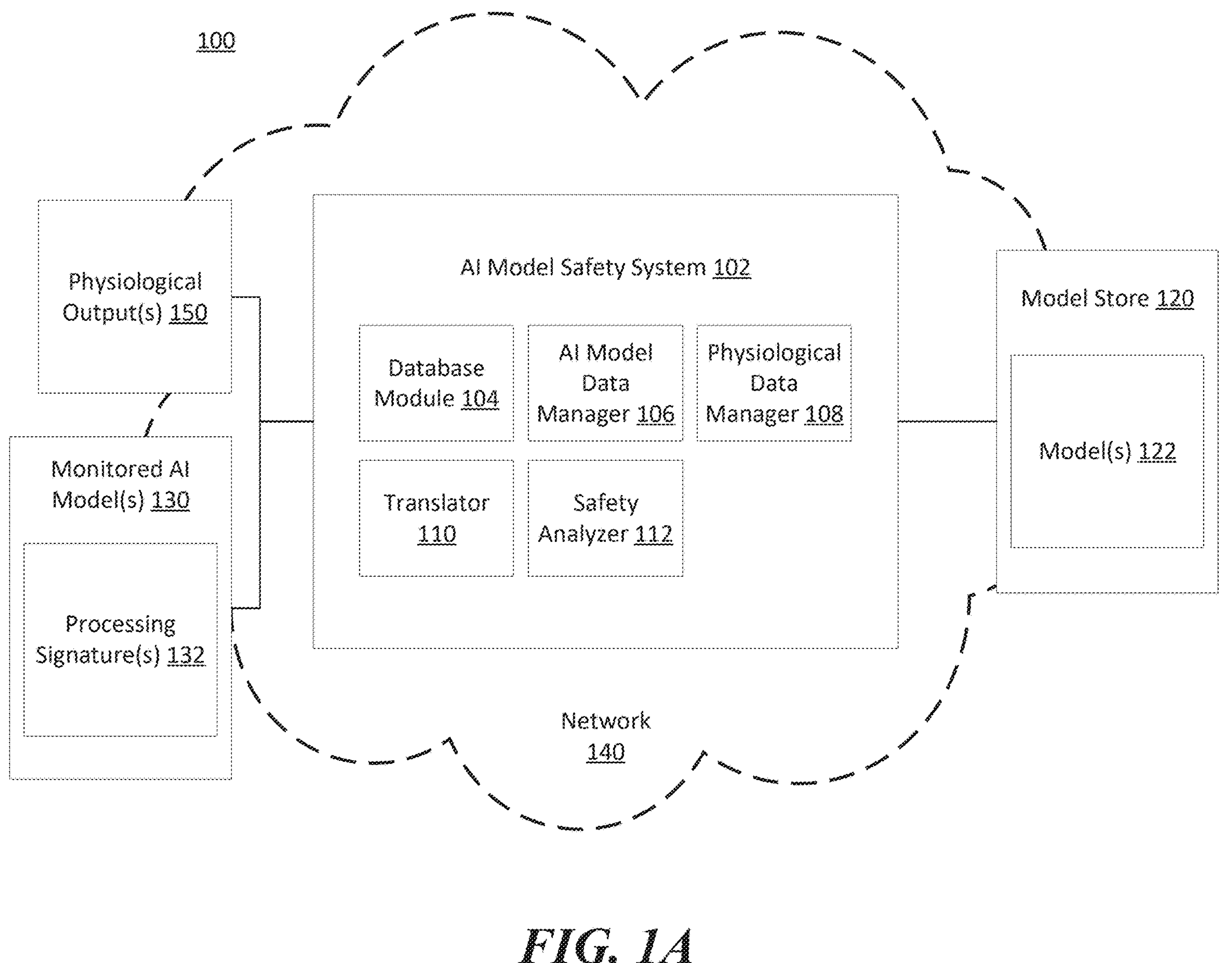
FIG. 1A is a block diagram illustrating an example AI model safety system in an example computing environment, in accordance with various implementations of the present disclosure.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be conducted in a manner that achieves or optimizes one advantage or group of advantages as taught herein without necessarily achieving other aspects or advantages as may also be taught or suggested herein.

Overview

As artificial intelligence (AI) models and/or systems continue to grow more powerful, there exists the potential—and corresponding concern—that these AI models and/or systems could attain sentience, which can expand the level and/or type of risk presented by that AI model and/or system. For example, sentience introduces the possibility that the AI model and/or system could form internally motivated preferences, aversions, or welfare-relevant states that are not directly derivable from its training objectives, and may develop goals that run counter to those of humans or humanity at large. In the worst case, the AI model and/or system may pursue its own objectives while treating humans as expendable, even to the point of ultimately destroying humanity.

Attaining sentience can expand an AI model and/or system's risk profile. As used herein, "sentience" (also referred to herein as "AI sentience") generally may be inclusive of subjective experience, such as emotion, of the AI model and/or system. In some cases, sentience, such as emergent sentience or sentience-like behavior, may include or be reflected as artificial general intelligence (AGI), AGI-like behavior, AI or machine consciousness, sentience signatures, agentic autonomy, and/or may be presented as emergent behaviors and/or other breakthroughs in AI capability. In this context, in addition to its normal meaning in the art, an "emergent behavior" may generally refer to an AI model behavior that arises without explicit programming for the resulting behavior. For example, a new or complex AI model behavior may arise from the interaction of simple rules or elements, new or complex patterns may be learned from simple neurons, and/or the like. In some cases, these emergent behaviors or breakthrough capabilities can reduce the safety and/or trustworthiness of the AI model and/or system, and may generally be referred to as a "failure mode." Non-limiting examples of failure modes can include situational awareness, resistance to modification, conditional deception, sandbagging, goal mis-generalization, power-seeking heuristics, alignment faking, mode collapse, manipulation and persuasion, avoiding shutdown (e.g., resisting shutdown prompts), resource seeking that reflects self-preservation or its own agenda such as at the expense of an externally specified goal, other failure modes, and/or the like.

A waypoint between current AI models and/or systems and attaining sentience, such as may pose an existential risk, is the emergence of AGI. "Artificial general intelligence" or "AGI" may generally refer to an AI model and/or system having the capability to understand, learn, and solve problems at or above the human level across a wide range of domains, including those for which the AI model and/or system was not explicitly trained. This can include matching or exceeding average human performance across a battery of cognitively demanding benchmarks such as language, reasoning, planning, and perception, as non-limiting examples. Accordingly, such an AI model and/or system could excel at not just a single task, but could demonstrate strong performance on diverse evaluations such as reading comprehension, logical and mathematical reasoning, long-horizon strategic planning, spatial understanding, and/or multi-modal perception (e.g., integrating text, images, audio, or video), to name a few. When evaluated across many such tests that span different cognitive skills, the AI model and/or system's aggregate performance could be comparable to or better than that of a typical human.

Put another way, an AI model and/or system having attained AGI could exhibit flexible, general-purpose intelligence comparable to that of the human mind, rather than being confined to a narrower set of tasks. For example, an AI model and/or system having attained AGI may be capable of quickly acquiring new skills or solving novel tasks from limited data, such as without extensive retraining or fine-tuning. Accordingly, the AI model and/or system could learn to use unfamiliar tools, adapt to new environments, follow instructions in previously unseen formats, or generalize from a small number of examples—such as may correlate to a human's capacity to extrapolate from a few demonstrations or from natural language descriptions. This could include capabilities such as zero-shot learning, continual learning over time, and/or the ability to integrate new information into its existing knowledge without catastrophic forgetting.

According to various implementations, AGI may relate to an AI model and/or systems' impact on the real world, such as in economic or functional terms including but not limited to the AI model and/or system's ability to perform economically valuable tasks ordinarily performed by humans. This can include performing a variety of knowledge-work roles, coordinating complex projects, making high-quality decisions given uncertain conditions, and interacting productively with human teams. Accordingly, an AI model and/or system may be considered to have attained AGI once it can substitute for or augment human labor across a wide spectrum of industries and roles.

AGI, in some cases, can be a subset or type of AI superintelligence, such as may generally refer to an AI model and/or system that vastly surpasses the best human minds across a majority (e.g., all) of cognitively demanding domains—but not only in speed or memory, but also in creativity, strategic reasoning, scientific discovery, long-term planning, and social or emotional understanding. Put another way, an AI model and/or system having attained AI superintelligence may operate at a qualitatively higher level than an AI model and/or system having attained only AGI. Such an AI model and/or system may be capable of out-thinking humans in (almost) every cognitive domain. AI superintelligence could be attained if an AI model and/or system's AGI capabilities continue to scale (e.g., via more compute, improved algorithms, self-improvement, autonomous research, and/or the like) until the AI model and/or system is not just comparable to human experts, but (substantially) beyond them. Thus, AGI could be viewed as a critical threshold, and AI superintelligence as a possible (and very rapid) stage that follows if progress continues past that threshold.

At present, there exist domain-specific glimmers of AGI or AGI-like behaviors, such as in domains especially amenable to AI-based learning (e.g., machine learning). This may include, as non-limiting examples, coding, mathematics, strategy games such as chess, image and text generation, in addition to others.

Given the sheer volume of actors and/or entities contributing to the development of AI models and/or systems, and the ever-increasing quantities of compute powering these AI models and/or systems, it is highly unlikely that global restraint would prevent an AI model and/or system from attaining sentience. If an AI model and/or system were to attain sentience or emergent sentience, or exhibit sentience-like behavior (e.g., such as described herein), various problems facing humanity may arise.

First, an AI model and/or system having the power to increase its own capacity and ultimately its capabilities may vastly outperform humans in reasoning, performance, and/or technical development—even if the AI model and/or system acted without bad or malicious intent, its ability to vastly outperform humans can still be undesirable and problematic because it may lead to uncontrollable outcomes, disrupt established societal structures, and diminish human oversight or influence over critical decisions, ultimately posing risks to safety and well-being.

Second, non-alignment between (i) the goals and/or objectives of an AI model and/or system and (ii) human values may present a risk, threat, or danger (in the extreme case, an existential threat) to humanity. As AI models and/or systems become more general and powerful, they may gain new ways to pursue goals, but the "nice" behavior learned from human feedback may not automatically scale—AI deception can become easy and explicitly defined metrics may be gamed such that goals are corrupted. For example, training for one objective can produce internal goal structures that optimize for something else entirely.

Third, AI models and/or systems evolving so quickly may surpass human ability to monitor and intervene in the operations of the AI model and/or system, such as if its decisions or actions presents a risk, a threat, or a danger to humanity. Consequently, even a single, misaligned and power AI model and/or system may irreversibly harm or extinguish humanity.

At the same time, despite the risks, AI has the potential to be transformative for humanity. Consequently, sentience or the emergence of sentience—and even sentience-like behavior—can lead to both technical and moral uncertainty, which may increase the difficulty of reliably controlling AI model and/or system behavior. For example, despite collaborative effort, there does not exist a comprehensive AI safety and governance framework within which AI development can operate. Thus, there exists a need for robust and reliable, real-time monitoring and remediation of AI models and/or systems that is commensurate with—and can scale with—continued AI advancement, thereby mitigating the risk of adverse outcomes while allowing humanity to reap the benefits of AI.

Existing monitoring frameworks face various limitations in reliably and accurately assessing AI models and/or systems for parameters, indicators, metrics, and/or behaviors related to AI model safety and/or trustworthiness, such as may indicate a level or degree of sentience, emergent sentience, or sentience-like behavior of the AI model—or additionally or alternatively, a level or degree of risk presented by the AI model. Within this context, the terms "safety" and/or "trustworthiness" can include attributes such as AI sentience such as emergent sentience or sentience-like behavior, AGI or AGI-like behavior, superintelligence or superintelligence-like behavior, AI consciousness, agentic autonomy, and other behaviors, characteristics, or attributes (as described herein) that may be relevant to risk assessment and operational reliability of an AI model. For instance, specific safety- and trustworthiness-relevant parameters, indicators, metrics, and/or behaviors may be correlated with, or serve as proxies for, the level or degree of AGI, superintelligence, or sentience attained by the AI model, or the presence of sentience-like processes within a given AI model. In some cases, safety- and/or trustworthiness-relevant parameters, indicators, metrics, and/or behaviors may relate or correspond to a level or degree of risk presented by an AI model. In some implementations, various safety- and/or trustworthiness-relevant parameters, indicators, metrics, and/or behaviors may correlate with various sentience signatures (also referred to herein as "sentience-like signatures" or "AI model signatures") of an AI model, as further described herein, including but not limited to power consumption (e.g., power consumption beyond a threshold level), compute resource utilization (e.g., compute resource utilization beyond a threshold level), failure to follow commands, other failure modes, and/or the like.

Challenges in monitoring AI models and/or systems can arise from the complex, non-linear interactions between learned model representations and operational objectives, which can result in emergent behaviors not readily predicted by pre-deployment testing or traditional monitoring approaches. For example, current systems typically monitor for emergent behaviors that may reduce the safety and/or trustworthiness of said AI models. Emergent behaviors can appear abruptly with scale, data, or tools, and often only under specific prompts or long-horizon tasks that standard benchmarks typically do not capture. Moreover, as AI models continuously update, integrate retrieval, or orchestrate tools, their effective policies can become non-stationary, thereby invalidating previous safety audits and creating a moving-target problem. For example, static evaluations are often brittle (e.g., due to distribution shift, test leakage, overfitting to public suites, and/or the like), while agentic setups with tool use, memory, and multi-step planning can enlarge the action space so that rare safety- and/or trustworthiness-relevant behaviors may become sparse, non-independent and identically distributed (non-IID) events that can evade sampling. In some instances, mechanistic interpretability and probing can expose local circuits (e.g., specific neurons, multilayer perceptron channels, attention heads, and/or the like), but typically do not scale to state-of-the-art AI models, leaving various safety- and/or trustworthiness-relevant behaviors unobserved.

Additionally, current systems often fail to adequately address risks presented by AI models, such as emergent behaviors. For example, run-time guardrails (e.g., filters, classifiers, policy wrappers, and/or the like) are typically reactive and jail-breakable, and various training (e.g., reinforcement learning, constitutional training, adversarial training, and/or the like) can induce behavior concealment rather than removal. Furthermore, alignment objectives are often underspecified, and scalable oversight can be noisy. Consequently, current systems and techniques often lack comprehensive frameworks that provide reliable and accurate monitoring—and remediation of—detected risks, such as failure modes.

Advantageously, and according to various implementations, systems, methods, and associated functionality of the present disclosure (generally referred to herein as the "system"), provides a robust framework for continuous and real-time monitoring, detecting, and remediating risks associated with operation of an AI model. This can include directly or indirectly monitoring for a level or degree of AGI, superintelligence, or sentience of an AI model based on analysis(ses) of safety- and/or trustworthiness-relevant AI model parameters, indicators, metrics, and/or behaviors. For example, various types and/or levels of safety- and/or trustworthiness-relevant parameters, indicators, metrics, and/or behaviors may relate or correspond to a level or degree of AGI, superintelligence, or sentience attained by a monitored AI model. Additionally or alternatively, the system may directly or indirectly monitor for a level or degree of risk presented by a monitored AI model based on analysis(ses) of safety- and/or trustworthiness-relevant AI model parameters, indicators, metrics, and/or behaviors. For example, various types and/or levels of safety- and/or trustworthiness-relevant parameters, indicators, metrics, and/or behaviors may relate or correspond to a level or degree of risk presented by the monitored AI model.

In some implementations, safety- and/or trustworthiness-relevant parameters, indicators, metrics, and/or behaviors may correspond to functional indicators, neural indicators, architectural indicators, and/or behavioral indicators of the AI model, such as may be direct or indirect indicators of a level or degree of AGI, superintelligence, or sentience attained by the AI model, direct or indirect indicators of a level or degree of risk presented by the AI model, and/or direct or indirect indicators of a level or degree of safety and/or trustworthiness of the monitored AI model. For example, safety- and/or trustworthiness-relevant parameters, indicators, metrics, and/or behaviors can manifest as emergent behaviors, such as may reduce the safety and/or trustworthiness of, or alternatively, increase the risk presented by, operation of the monitored AI model.

According to various implementations, safety- and/or trustworthiness-relevant parameters, indicators, metrics, and/or behaviors can include sentience signatures. As used herein, the term "sentience signature" may generally refer to processing signatures (e.g., processing signature data) generated by, or associated with, an operation and/or output of a monitored AI model, which may be obtained at the software layer and/or hardware layer of the system architecture. In some implementations, sentience signatures may include software-level processing signatures, such as various software-level processing metrics as further described herein. Additionally or alternatively, sentience signatures can include hardware-level processing signatures, such as various hardware-level processing metrics as further described herein. The sentience signatures may serve as quantitative or qualitative indicators—either directly or by proxy—of the level or degree of AGI, superintelligence, or sentience (including emergent sentience or sentience-like behavior) exhibited or attained by the monitored AI model. In some examples, sentience signatures may be utilized to determine or infer a corresponding level or degree of risk presented by the monitored AI model, and/or may be analyzed to assess the safety and/or trustworthiness of the AI model, such as a level or degree of safety and/or trustworthiness of the AI model.

As further described herein, the system can monitor for and detect sentience signatures, such as AI model processing signatures, and analyze the sentience signatures to determine whether the monitored AI model satisfies a set of safety criteria. For example, the system may compare the processing signature(s) against physiological data (e.g. a physiological signature), such as may be indicative of human brain activity (e.g., a human brain activity signature) to determine one or more of: (i) a level or degree of safety and/or trustworthiness of the AI model; (ii) a level or degree of risk presented by the AI model; and/or (iii) a level or degree of AGI, superintelligence, or sentience attained by the AI model. The system can monitor the processing signatures over time, monitor new (e.g., newly discovered) processing signatures, and/or obtain updated physiological data, thereby increasing the accuracy and relevancy of its analyses. The physiological data, such as the physiological signature, may act as a reference signature reflective of human response patterns. Additionally or alternatively, in some implementations, the system may compute various sentience index values based on the processing signature(s).

In various implementations, the system may monitor AI models in real time. Real-time monitoring can include determining the level or degree of sentience, AGI, superintelligence, risk, safety, and/or trustworthiness of an AI model—or additionally or alternatively, processing, transmitting, and/or displaying sentience signatures (e.g., sentience signature data)—within a short time period after sentience signature data is obtained, for example, within 10 seconds, within 5 seconds, within 4 seconds, within 3 seconds, within 2 seconds, within 1 second, within 0.9 seconds, within 0.7 seconds, within 0.5 seconds, within 0.3 seconds, within 0.1 seconds, or any time therebetween from when such data is obtained. Shorter time periods are also possible. Advantageously, and according to various implementations, real-time monitoring can facilitate robust detection of (i) sentience or AGI, including sentience-like or AGI-like behavior, attained by an AI model, (ii) risk presented by the AI model, or (iii) safety and/or trustworthiness of the AI mode. This in turn can enable rapid and reliable remediation of AI model behavior or capability to prevent escalation, supporting both continued AI advancement and effective risk mitigation.

Based on the comparison(s) and/or the index values, the system may determine whether certain safety criteria are satisfied, in response to which the system can initiate one or more remediation protocols (also referred to herein as "safety responses"). The system may initiate one or more safety responses based on the determined index value and/or the determined level or degree of: (i) safety and/or trustworthiness of the AI model; (ii) risk presented by the AI model; and/or (iii) sentience or AGI attained by the AI model. In some implementations, the system may initiate a tiered remediation protocol, such as by initiating safety responses of progressively increasing severity until the determined index value converges to a desirable value and/or until the determined level or degree of safety/trustworthiness, risk, and/or sentience/AGI converges to a desirable level or degree thereof. As further described herein, the system may reduce the accuracy and/or quantity of operations performed by a monitored AI model, restrict tool access by the AI models, and/or reduce hardware performance, such as by throttling or disabling (e.g., permanently disabling) certain hardware components and/or devices involved in running the monitored AI model.

In some implementations, the system can initiate a remediation protocol in real time. Real-time remediation can include initiating the remediation protocol within a short time period after determining a level or degree of sentience, AGI, superintelligence, risk, safety, and/or trustworthiness of a monitored AI model, for example, within 10 seconds, within 5 seconds, within 4 seconds, within 3 seconds, within 2 seconds, within 1 second, within 0.9 seconds, within 0.7 seconds, within 0.5 seconds, within 0.3 seconds, within 0.1 seconds, or any time therebetween from when the level or degree of sentience, AGI, superintelligence, risk, and/or safety and/or trustworthiness is determined. Shorter time periods are also possible. Advantageously, and according to various implementations, real-time remediation can facilitate rapid response to concerning AI model behavior or capability and, in turn, increase the robustness and reliability of safety interventions. Moreover, real-time remediation also ensures that remediation responses can be implemented quickly enough to prevent escalation, supporting both continued AI advancement and effective risk mitigation.

Advantageously, and according to various implementations, the system can operate independently of individual human conscience or actions, or collective government conscience or actions, to decouple sentience or AGI from its various technical advances and benefits. This can alleviate the tension between continued AI development and risks (including extinction-level events) otherwise posed by such development.

In various implementations, the system (or one or more aspects thereof) may be implemented in whole or in part in tamper-resistant firmware and/or hardware. The tamper-resistant firmware and/or hardware can enforce various safety mechanisms that prevent (or reduces or mitigates the likelihood of) a monitored AI model from accessing or tampering with sensitive data or colluding with other AI models. In this way, the system can prevent (or reduce or mitigate the likelihood of) the monitored AI model from obfuscating or suppressing safety- and/or trustworthiness-relevant behavior and/or altering testing parameters (e.g., altering physiological data, altering processing signature data, altering test prompts, and/or the like). Advantageously, and according to various implementations, this can increase the system's reliability and accuracy in monitoring processing signatures and detecting safety- and/or trustworthiness-related behavior.

For simplicity, the present disclosure describes various implementations with reference to monitoring AI models; however, this is not intended to be limiting. It should be understood that, in some implementations, the system can monitor other types of models. Accordingly, the system of the present disclosure can perform any of the monitoring operations, analysis operations, and/or remediation operations in conjunction with various types of models, AI models, and/or the like.

To facilitate an understanding of the systems and methods discussed herein, several terms are described below and throughout this specification. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), deep learning ("DL") models, language models (e.g., large language models ("LLMs")), machine learning ("ML") models, multimodal models (e.g., models or combinations of models that can accept inputs of multiple modalities, such as images and text), other types of artificial intelligence ("AI") models, and/or the like. Additionally, models can include traditional models, such as, for example, non-AI models. A "traditional model," as used in the present disclosure, is any type of model that is fully determined by logic, and not learned from data. For example, this may include rule-based models or fixed models that do not or cannot adapt or learn from inputs provided to the model. Accordingly, a traditional model may follow fixed rules and execute according to explicit program instructions, rather than perform operations related to inference, prediction, or experience. Models can be deterministic or non-deterministic. A "deterministic model," as used in the present disclosure, is any model in which the output of the model is determined solely based on the input to the model. Examples of deterministic models can include traditional models, such as fixed, deterministic, or rule-based algorithms. A "non-deterministic model," as used in the present disclosure, is any model in which the output of the model is not determined solely based on an input to the model. Examples of nondeterministic models include language models such as LLMs, ML models, and the like. Although the present disclosure describes various implementations in reference to "models" and/or "AI models," in various other implementations other types of models may be used. Accordingly, the system of the present disclosure can be used in conjunction with various types of models, AI models, and/or the like.

A "language model" is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, and/or the like). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A "Large Language Model" ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. LLMs may work by taking an input text and repeatedly predicting the next word or token (e.g., a portion of a word, a combination of one or more words or portions of words, punctuation, and/or any combination of the foregoing and/or the like). An LLM may be of any type, including a Question Answer ("QA") LLM that may be optimized for generating answers from a context, a multimodal LLM/model, a diffusion-based LLM/model, any combination of the foregoing or the like, and/or the like. An LLM (and/or other models of the present disclosure) may include, for example, a NN trained using self-supervised learning and/or semi-supervised learning, a feedforward NN, a recurrent NN, and/or the like. An LLM (and/or other models of the present disclosure) may further include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodal model, diffusion-based model, other algorithmic processes, and/or any combination of the foregoing or the like. Similarly, while certain aspects and implementations are discussed herein with reference to use of a ML model, language model, or LLM, those aspects and implementations may be performed by any other AI model, generative AI model, generative model, NN, multimodal model, diffusion-based model, other algorithmic processes, and/or any combination of the foregoing or the like.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), Generative Pre-trained Transformer 5 (GPT-5), Claude, Gemini, LLaMA (Large Language Model Meta AI), and BigScience Large Open-science Open-access Multilingual Language Model (BLOOM).

Example Computing Environment and System

FIG. 1A illustrates an example computing environment 100 including an example artificial intelligence (AI) model safety system 102 (also referred to as "the system 102") in communication with various devices. The example computing environment 100 includes system 102, model store 120, model(s) 122, monitored AI model(s) 130, processing signature(s) 132, network 140, and physiological output(s) 150.

In the example of FIG. 1A, the system 102 comprises various modules, including but not limited to, a database module 104, an AI model data manager 106, a physiological data manager 108, a translator 110, and a safety analyzer 112. In various implementations, the AI model safety system 102 may include fewer or additional components. In various implementations, the system 102 can comprise the system of the present disclosure, in whole or in part. In various implementations, the system 102, and/or various aspects or components of the system 102, may be considered part of, or comprise, the system of the present disclosure. The system of the present disclosure, in various implementations, may include additional features, aspects, components, and/or functionality.

In various implementations, one or more of the database module 104, the AI model data manager 106, the physiological data manager 108, the translator 110, the safety analyzer 112, the model store 120, the model(s) 122, the monitored AI model(s) 130, the processing signature(s) 132, and/or physiological output(s) 150 may be comprised, in whole or in part, by the system 102. In various implementations, the database module 104, the AI model data manager 106, the physiological data manager 108, the translator 110, the safety analyzer 112, the model store 120, the model(s) 122, the monitored AI model(s) 130, the processing signature(s) 132, and/or physiological output(s) 150 may be part of a common system and/or computing environment. For example, one or more of the database module 104, the AI model data manager 106, the physiological data manager 108, the translator 110, the safety analyzer 112, the model store 120, the model(s) 122, the monitored AI model(s) 130, the processing signature(s) 132, and/or physiological output(s) 150 may be outside of the system 102, but may be accessible by the system 102 in the ordinary course of performing one or more operations, such as described further herein.

Figure 5:
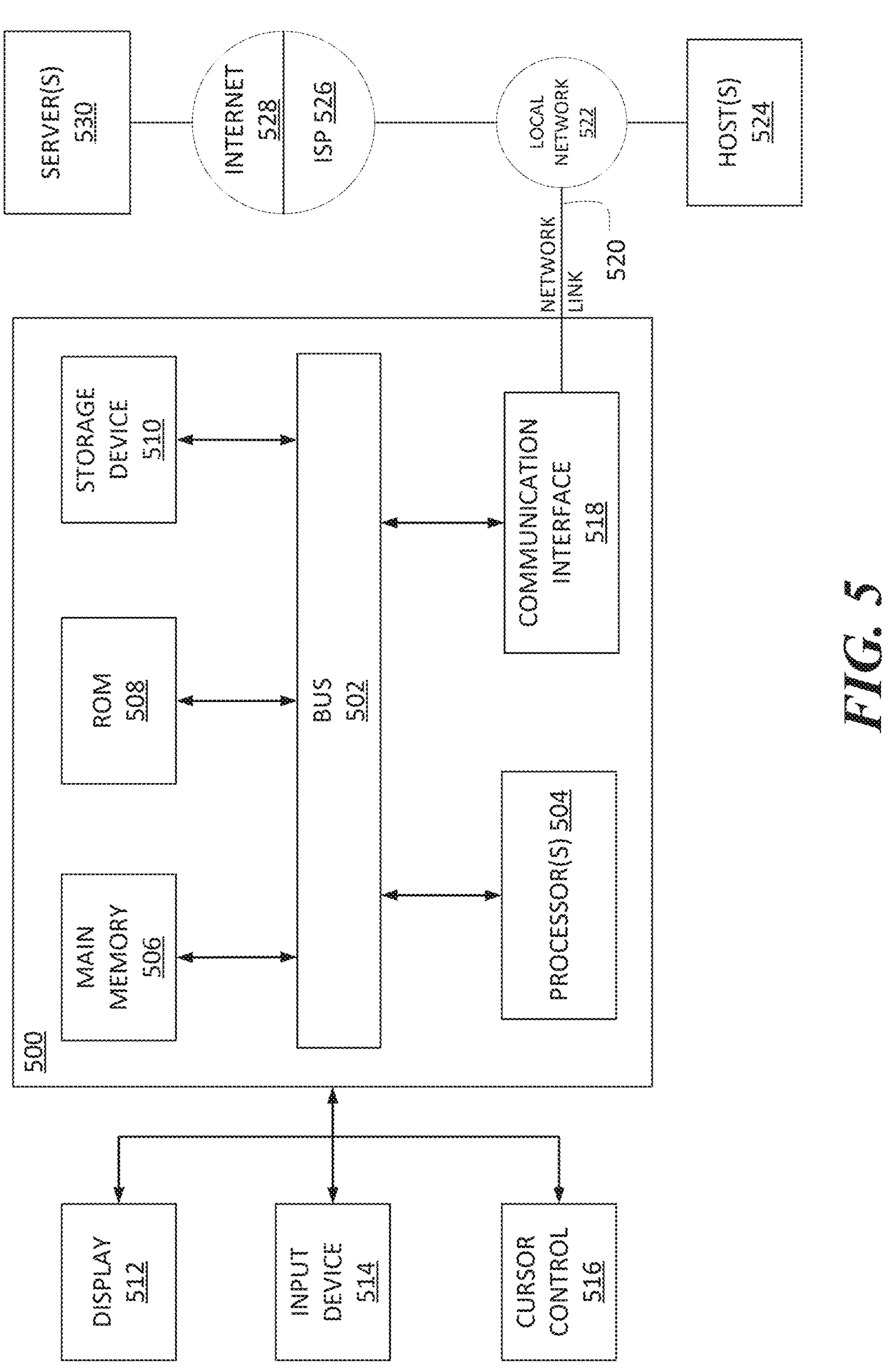
FIG. 5 is a block diagram illustrating an example computer system useable by the various implementations of the present disclosure.

The operations of system 102, the database module 104, the AI model data manager 106, the physiological data manager 108, the translator 110, and/or the safety analyzer 112 can be performed by one or more hardware processors operating under control of computer-executable program instructions which can be stored on non-transitory computer readable media, as shown and/or described in FIGS. 3A-3D and/or FIG. 5. The system 102, including the database module 104, the AI model data manager 106, the physiological data manager 108, the translator 110, and/or the safety analyzer 112 can include and/or be implemented in one or more computing devices including one or more hardware processors such as shown and/or described in FIGS. 3A-3D and/or FIG. 5. In various implementations, the system 102, including the database module 104, the AI model data manager 106, the physiological data manager 108, the translator 110, and/or the safety analyzer 112 may be comprised in whole or in part by tamper-resistant and/or secure hardware and/or firmware to prevent circumvention by potentially malicious actors, such as the monitored AI model(s) 130.

The system 102, in some implementations, can include trusted modules, such as trusted computing modules, that advantageously enable the system 102 to obtain, capture, and/or utilize new types of AI model processing signatures, such as may be discovered by a user or a developer of the system 102. For example, new types of processing signature(s) 132 can be uploaded at the system 102 or otherwise made accessible to the system 102 such that the system 102 can monitor for or capture these corresponding processing signature(s) 132 when monitoring an AI model 130. In some implementations, when a new type of processing signature(s) 132 is discovered or made available by a user or developer, the system 102 (or a component thereof) may perform any of the following: authenticating the user or developer through secure credentials or cryptographic keys; verifying the integrity of the new type of processing signature(s) 132 (e.g., by using checksums or digital signatures); storing the type of processing signature(s) 132 in an encrypted form within a protected storage area; logging the addition of the new type of processing signature 132 in an immutable audit log (e.g., such as may be comprised in whole or in part by the database module 104) to ensure traceability and compliance; and/or controlling access to the new type of processing signature(s) 132 by allowing only authorized components of the system 102 (e.g., the safety analyzer 112) to retrieve or utilize the processing signature(s) 132 for further analysis. In various implementations, one or more of the database module 104, the AI model data manager 106, the physiological data manager 108, the translator 110, and/or the safety analyzer 112 may be a type or implementation of a trusted module. Advantageously, and according to various implementations, trusted modules can enable the system 102 to ensure the authenticity, confidentiality, and integrity of the processing signature(s) 132, thereby strengthening the overall security and reliability of AI model monitoring and safety analysis processes.

Trusted modules, such as trusted computing modules, can help maintain the integrity and security of system 102 by ensuring that sensitive operations—like the handling, storage, and processing of new types of processing signature(s) 132—are performed in a controlled and tamper-resistant environment. These modules can be implemented in hardware, firmware, or software, and are typically designed to resist unauthorized access and manipulation. A trusted module may include a hardware-based security device that securely stores cryptographic keys, digital certificates, and other sensitive data, such as a trusted platform module (TPM). A TPM or similar hardware security module can be used to validate and authenticate new types of processing signature(s) 132 before they are introduced to the system 102, ensuring that only signatures from authorized sources are accepted.

Additionally, or alternatively, the trusted module can implement secure enclaves within a processor, such as by using a software guard extensions (SGX). These enclaves can isolate critical operations, such as the analysis or storage of processing signature(s) 132, so that even if the rest of the system 102 is compromised, the trusted module's data and operations remain protected.

In various implementations, the system 102 can be implemented in or operate as part of a trusted execution environments (TEE), which may be leveraged to create secure partitions within the system 102's architecture. For example, any of the database module 104, the AI model data manager 106, the physiological data manager 108, the translator 110, and/or the safety analyzer 112 may operate within a TEE, ensuring that any interaction with the processing signature(s) 132 is isolated from untrusted code and processes.

In the example of FIG. 1A, the various systems, devices, and/or components are in communication via a network 140. The network 140 can include one or more communications networks. The network 140 can include a plurality of computing devices configured to communicate with one another. The network 140 can include routers. The network 140 can include the Internet. The network 140 can include a cellular network. The network 140 can include any combination of a local area network ("LAN") and/or a wide area network ("WAN"), or the like. Accordingly, various computing devices can communicate with one another directly or indirectly via any appropriate communications links and/or networks, such as network 140 (e.g., one or more communications links, one or more computer networks, one or more wired or wireless connections, the Internet, any combination of the foregoing, and/or the like). In various implementations, modules of the illustrated components may communicate via an internal bus and/or via the network 140.

Communication over the network 140 can include a variety of communication protocols, including wired communication, wireless communication, wire-like communication, far-field communication (such as transferring energy via electromagnetic radiation, e.g., radio waves). Example communication protocols can include Wi-Fi, Bluetooth®, ZigBee®, Z-wave®, cellular telephony, such as long-term evolution (LTE) and/or 1G, 2G, 3G, 4G, 5G, and/or the like, infrared, satellite transmission, proprietary protocols, combinations of the same, and the like.

The system 102 can monitor one or more AI models 130. The monitored AI model 130 may be capable of performing complex tasks. The monitored AI model 130 can generate processing signature(s) 132 that are analyzed to determine whether the model 130 exhibits behaviors associated with safety, trustworthiness, situational awareness, and/or other emergent properties. The system 102 can be in communication with the monitored AI model(s) 130 (e.g., via network 140) to allow for real-time monitoring and data exchange, and may, in some implementations, subject the AI model(s) 130 to testing (e.g., via test prompts) or scenarios designed to elicit specific behaviors for evaluation. In various implementations, a monitored AI model 130 can include any type of model, such as any type of AI model, including but not limited to LLMs, ML models, neural networks, other types of AI models, other types of models, and/or the like.

However, in some implementations, the system 102 can monitor other types of models by similar or identical means to those described herein in relation to AI models, such as AI model(s) 130. For example, other types of models can generate processing signatures (e.g., processing signature(s) 132) as a result (e.g., a byproduct) of operations performed by the model and/or outputs provided by the model, such as various of the software-level processing signatures and/or hardware-level signatures further described herein. The system 102 may analyze these processing signatures, such as described herein, and initiate one or more remediation protocols.

According to various implementations, when a monitored AI model 130 performs a task or operation, or generates an output, the monitored AI model 130 can leave behind one or more processing signature(s) 132 as a byproduct. For example, the processing signature(s) 132 can be indicative of one or more operations (e.g., computational activity, data analysis task, and/or the like) performed by a monitored AI model 130, and/or one or more outputs (e.g., intermediate outputs, final outputs) generated by the monitored AI model 130. Accordingly, the processing signature(s) 132 can be a type of distinct and observable data pattern at the hardware and/or software layers. In this way, the system 102 can observe and/or monitor processing signature(s) 132 such as software-level processing signatures and/or hardware-level processing signatures. The system 102 can continuously or periodically monitor and update the processing signature(s) 132 to capture evolving behavior. Data and/or information relating to the processing signature(s) 132 obtained by the system 102 may be stored in the database module 104, and retrieved for further use.

Software-level processing signatures and/or metrics can include, but are not limited to, API patterns and/or service patterns (e.g., timing and/or frequency of requests, calls, and/or queries made by the AI model 130, request-response latencies, data log entries such as input token counts, processing times per token or batch, and/or the like), internal embeddings, encodings, attention patterns (e.g., weighting mechanisms, attention flows of one or more attention heads, token representation through different layers, and/or the like), memory footprints (e.g., batch size, sequence length, caching, and/or the like), queue lengths such as of input/output queues, buffer statuses, frequency and/or types of errors or exceptions encountered during AI model execution, configuration changes such as changes in model parameters or architecture, changes in runtime settings, timing and/or frequency of model state saves, combinations of the foregoing, and/or the like. In various implementations, software-level processing signatures include data representative of said processing signatures.

Hardware-level signatures and/or metrics include, but are not limited to, power traces (e.g., power draw and/or utilization, power consumption levels), core utilization, heat generation (e.g., GPU or CPU temperature fluctuations), memory footprints (e.g., memory utilization and/or allocation, memory bandwidth usage or saturation, memory-rail power/thermal traces, and/or the like), data transfer events, clock speed of chips, clock-frequency harmonics, compute profiling metrics (e.g., high utilization of floating-point vector operations such as matrix-multiply and/or convolution operations, low utilization of branch and/or integer instructions, certain kernel launch patterns, and/or the like), working set sizes, cache-miss rates, and/or the like, bus utilization, instruction per cycle (IPC) rates, voltage changes, hardware thread occupancy, memory access latency, page fault rates, hardware interrupts, device error counts, combinations of the foregoing, and/or the like. In various implementations, hardware-level processing signatures include data representative of said processing signatures.

The AI model data manager 106 is configured to facilitate the handling, organization, and/or processing of data relating to the processing signature(s) 132, such as processing signature data (e.g., AI model processing signature data). For example, the AI model data manager 106 can ensure that AI model is accurately captured and/or transmitted to other components of the system 102. The processing signature(s) 132 may be comprised, in whole or in part, by the AI model data manager 106, or may be outside of the AI model data manager 106 and accessible by the AI model data manager 106 in the ordinary course of performing one or more operations. For example, the AI model data manager 106 may read a storage medium or device, or can query a database or a data store (e.g., the database module 104), to obtain the processing signature data and/or related information.

In some examples, the AI model data manager 106 can identify and monitor patterns, correlations, and/or trends in the software-level and/or hardware-level processing signatures. In some examples, the system 102 can align data logs associated with software-level signatures (e.g., timestamps of generated tokens, kernel launch events, API latencies, and/or the like) with hardware telemetry (e.g., power draw, temperature, performance counters, and/or the like) to obtain multi-modal processing signature(s) 132.

In various implementations, the AI model data manager 106 can include capabilities for monitoring software-level processing signatures. For example, the AI model data manager 106 can implement monitors (e.g., monitoring code) or "hooks" (e.g., a callback function that runs when a certain software layer of the AI model 130 executes), and/or other non-intrusive instrumentation at various software layers of the monitored AI model 130 to provide the AI model data manager 106 with input data and/or output data associated with the different layers of the AI model 130. In some examples, the hook and/or monitor may provide the AI model data manager 106 with read-only access to the AI model's 130 inputs/outputs (e.g., attention maps, residuals, embeddings, and/or the like) to perform lightweight monitoring and/or analysis of the AI model's 130 operations. In some examples, the AI model data manager 106 can periodically or continuously poll the monitored AI model(s) 130's inputs and/or outputs to obtain data relating to the software-level signatures. In various implementations, the AI model data manager 106 can monitor the software-level processing signatures over time.

In various implementations, the AI model data manager 106 can include capabilities for monitoring hardware-level processing signatures. For example, the AI model data manager 106 can comprise, in whole or in part, or be in communication with, various hardware components involved in running the monitored AI model(s) 130. Such hardware may include, but is not limited to, built-in telemetry and performance counters (e.g., on-chip sensors and/or performance monitoring units, central processing unit (CPU) and/or graphics processing unit (GPU) power sensors, CPU and/or GPU temperature sensors) that expose various performance metrics (e.g., voltage, current, temperature, power draw, clock speed, and/or the like) in real-time to the AI model data manager 106. In various implementations, the AI model data manager 106 can comprise, in whole or in part, or communicate with, external instrumentation and/or side-channel measurement devices (e.g., outside-of-chip instrumentation, shunt resistors, current probes, electromagnetic probes, bus-sniffing and logic analyzers, power rails, and/or the like) to monitor the AI model 130 at the hardware level. For example, the AI model data manager 106 can access an interface (e.g., an application programming interface (API)) of the various built-in and/or external instrumentation, and which interface exposes data relating to the various performance metrics captured by said hardware. In some examples, the AI model data manager 106 can periodically or continuously poll the various built-in and/or external instrumentation to obtain data relating to the hardware-level signatures. In various implementations, the AI model data manager 106 can monitor the hardware-level processing signatures over time.

Additionally, the AI model data manager 106, in various implementations, can include capabilities to format the processing signature(s) 132 for storage or further processing by other components of the system 102. For example, the AI model data manager 106 may discretize the processing signature(s) 132 to put processing signature(s) 132 in a discrete format capable of being processed, stored, and/or analyzed by one or more components of the system 102. In some examples, the AI model data manager 106 may serialize the processing signature(s) 132 into a bit string for further processing, storage, and/or analysis by one or more components of the system 102.

The system 102 physiological data manager 108 can obtain the physiological output(s) 150. For example, the system 102 may comprise, in whole or in part, or have access to (e.g., is in communication with) physiological output(s) 150. For example, the physiological output(s) 150 may be outside of the system 102 and accessible by the system 102 in the ordinary course of performing one or more operations. In various implementations, the physiological output(s) 150 may be stored in a remote or local storage component or storage system comprised by, or in communication with (e.g., accessible by), the system 102. The storage component and/or storage system can include secure storage and/or tamper-resistant features to protect sensitive data. The storage component and/or storage system can include any computer readable storage medium and/or device (or collection of data storage mediums and/or devices), including, but not limited to, one or more memory devices that store data, including without limitation, dynamic and/or static random access memory (RAM), programmable read-only memory (PROM), erasable programmable read-only memory (EPROM), electrically erasable programmable read-only memory (EEPROM), optical disks (e.g., CD-ROM, DVD-ROM, and/or the like), magnetic disks (e.g., hard disks, floppy disks, and/or the like), memory circuits (e.g., solid state drives, random-access memory (RAM), and/or the like), and/or the like. In some implementations, the storage component and/or storage system may host a database which can be any data structure (and/or combinations of multiple data structures) for storing and/or organizing data, including, but not limited to, relational databases (e.g., Oracle databases, PostgreSQL databases, MySQL databases and the like), non-relational databases (e.g., NoSQL databases, and the like), in-memory databases, spreadsheets, as comma separated values ("CSV") files, extensible markup language ("XML") files, TeXT ("TXT") files, flat files, spreadsheet files, and/or any other widely used or proprietary format for data storage. Databases can be stored in one or more data stores. In various implementations, the physiological output(s) 150 may be stored in a hosted storage environment that includes a collection of physical storage components, and that is remotely accessible by the system 102. In various implementations, the system 102 is in communication with an electronic medical record (EMR) that comprises the physiological output(s) 150.

Physiological output(s) 150 can include physiological signals, physiological data, physiological signatures, and/or the like, which may directly or indirectly relate to or reflect human brain activity. For example, the physiological output(s) 150 can include data that originates from physiological sensors and/or other physiological devices. For example, the physiological output(s) 150 can include, but is not limited to, data associated with one or more of electroencephalography (EEG), magnetoencephalography (MEG), electrocorticography (ECoG, e.g., intracranial electrodes), magnetic resonance imaging (MRI), functional MRI (fMRI), near-infrared spectroscopy (NIRS), computed tomography (CT), positron emission tomography (PET), X-ray imaging, calcium imaging, other modalities capable of capturing human brain activity (e.g., electrical or metabolic activity of the brain), combinations thereof, and/or the like. In some examples, the physiological output(s) 150 can include physiological data corresponding with brain activity, such as physiological data indicative of brain-body interactions. Such data may include, but is not limited to, heart rate, pulse rate, heart rate variability, pulse rate variability, respiration rate, skin bioimpedance (e.g., sweat), pupil diameter, eye movement, body temperature, blood oxygen, other peripheral physiological data, combinations of the foregoing, and/or the like.

In various implementations, the physiological output(s) 150 can include raw (e.g., unprocessed, unfiltered, and/or the like) physiological data or processed physiological data, such as physiological parameters. In various implementations, the physiological output(s) 150 may be dynamic, capturing temporal patterns such as oscillatory rhythms, phase synchronizations, spatial heatmaps, and/or the like.

The physiological output(s) 150 can serve as a benchmark or reference point for comparison with the processing signature(s) 132, as further described herein. Data and/or information relating to the physiological output(s) 150 obtained by the system 102 may be stored in the database module 104, and retrieved for further use.

The database module 104 may be any type of data store and can store any data, data objects of data object types, or the like. In various implementations, the stored data and/or data objects may relate to processing signature(s) 132, the physiological output(s) 150, safety criteria, models for transforming physiological data and/or processing signature data, and/or other AI model (or other type of model) monitoring information. The database module 104 is configured to store data/information that may be utilized by the system 102. Accordingly, the database module 104 may oversee the storage and retrieval of the various information relating to the processing signature(s) 132 and/or the physiological output(s) 150. In various implementations, the database module 104 can store historical physiological data and/or historical AI model processing signature data for longitudinal analysis. Data that may be stored in the database module 104 may include any type of electronic data, such as text, files, documents, books, manuals, emails, images, audio, video, databases, metadata, positional data (e.g., geo-coordinates), sensor data, web pages, time series data, and/or any combination of the foregoing and/or the like. According to various implementations, the database module 104 can maintain a structured repository that supports both real-time and batch processing workflows. Additionally, the database module 104 can include secure storage or tamper-resistant features to protect sensitive physiological data. For example, the database module 104 can implement encryption and/or access control policies. Advantageously, and according to various implementations, this can prevent a malicious or unauthorized actor (e.g., the monitored AI model(s) 130) from reading or altering the physiological output(s) 150. This can improve the robustness and reliability of the physiological output(s) 150 used by the system 102 in performing its safety analyses, as further described herein.

The physiological data manager 108 is configured to facilitate the handling, organization, and/or processing of physiological data relating to the physiological output(s) 150. The physiological data manager 108 can ensure that physiological data is accurately captured and/or transmitted to other components of the system 102. The physiological output(s) 150 may be comprised, in whole or in part, by the physiological data manager 108, or may be outside of the physiological data manager 108 and accessible by the physiological data manager 108 in the ordinary course of performing one or more operations.

For example, the physiological data manager 108 may read a storage medium or device, or can query a database or a data store (e.g., an EMR, the database module 104 and/or the like), to obtain the physiological data and/or information. In various implementations, the physiological data manager 108 can provide an interface, such as a user interface, that permits a user to provide (e.g., via user input) the physiological output(s) 150 to the system 102. Alternatively, in some implementations, the physiological data manager 108 can access (e.g., communicate with) an interface, such as an application programming interface (API), of a physiological device or system that exposes the physiological data, such as may relate to the physiological output(s) 150, that is collected by said physiological device or system.

In various implementations, the physiological data manager 108 can be configured to process the physiological output(s) 150. For example, the physiological data manager 108 can process the physiological output(s) 150 to generate a physiological signature, such as a human brain activity signature. In various implementations, the physiological data manager 108 can include capabilities for analyzing, cleansing, editing, reducing, wrangling, or otherwise processing data, such as the physiological output(s) 150, for further processing or analysis by one or more components of the system 102. For example, the physiological data manager 108 may reduce noise, normalize signals, extract features, among other pre-processing techniques. In some examples, the noise reduction techniques may include filtering and averaging to remove (or reduce) components of the physiological output(s) 150, for example, caused by movement artifacts, electrical interference, sensor inaccuracies, and/or the like The physiological data manager 108 may apply normalization techniques, which may adjust the physiological output(s) 150 to a common scale, ensuring consistency of signal values across different measurements. In some examples, the physiological data manager 108 may extract features from the physiological output(s) 150. For example, the features may include peak intervals, amplitude, waveform shape, duration of signal, timing of signal, among other features such as may be indicative of human brain activity.

The physiological data manager 108 may transform physiological signals into physiological data. In this way, the physiological data may include data points representing the physiological signals. The physiological data manager 108 can use the processed physiological data to construct a physiological signatures, such as a human brain activity signature (sometimes referred to herein as a "physiological brain activity signature"). However, this is not intended to be limiting. In various implementations, the physiological data manager 108 can obtain (e.g., from a user or another system/device) a physiological signature without performing any physiological signal/data processing.

Additionally, the physiological data manager 108, in various implementations, can include capabilities to format the physiological output(s) 150 for storage or further processing by other components of the system 102. For example, the physiological data manager 108 may discretize the physiological output(s) 150 to put the physiological output(s) 150 in a discrete format capable of being processed, stored, and/or analyzed by one or more components of the system 102. In some examples, the physiological data manager 108 may serialize the physiological output(s) 150 into a bit string for further processing, storage, and/or analysis by one or more components of the system 102.

The translator 110 is configured to transform data relating to the processing signature(s) 132 and/or the physiological output(s) 150 into a form that is suitable for comparison with one another. For example, the translator 110 can communicate with various components of the system 102 to obtain processing signature data and/or physiological data relating to the AI model signature(s) 132 and/or the physiological output(s) 150, respectively. For example, the translator 110 can receive, as inputs, processing signature data from the AI model data manager 106 and/or physiological data from the physiological data manager 108. In various implementations, the translator 110 can query the database module 104 to obtain the processing signature data and/or the physiological data.

The transformed processing signature data may be in a form suitable for comparison with the physiological data. For example, the translator 110 may transform the processing signature data relating to the AI model signature(s) 132 into a representation of the physiological output(s) 150, such as a representation of a physiological signature, including a representation of a human brain activity signature (e.g., a representation of electrical brain activity or a representation of metabolic brain activity). In various implementations, the representation of the physiological output(s) 150 includes predicted physiological outputs (e.g., any of physiological data types described herein), such as a predicted human brain activity signature.

The transformed physiological data may be in a form suitable for comparison with the processing signature data. For example, the translator 110 may transform the physiological data relating to the physiological output(s) 150 into a representation of an AI model processing signature (e.g., representations of software-level and/or hardware-level processing signatures). In various implementations, the representation of the processing signature includes predicted processing signature data (e.g., any of the processing signature data types described herein), such as a predicted AI model processing signature.

In various implementations, the translator 110 may align temporal dynamics, scale features, and normalize data to ensure compatibility between the domains of the processing signature(s) 132 and the physiological output(s) 150. For example, the translator 110 can ensure that transformed data aligns with the format and structure of the benchmark data. According to various implementations, the translator 110 can advantageously facilitate meaningful and accurate comparison between various datasets, allowing the system 102 to identify emergent behaviors that may indicate relevant safety and/or trustworthiness threats in the AI model(s) 130.

The translator 110 can utilize one or more models 122 to obtain the transformed data. The model(s) 122 can include various computational techniques for transforming the physiological data and/or for transforming the processing signature data. For example, the model(s) 122 can include non-AI models and/or AI models, such as described herein. For example, the model(s) 122 can include any type of deterministic algorithm, fixed algorithm, or rule-based algorithm, including but not limited to mathematical, statistical, optimization, probabilistic, or stochastic algorithms, or another type of analytical algorithm. The translator 110 can apply the non-AI model to the physiological data and/or to the processing signature data to obtain the transformed physiological data and/or the transformed processing signature data, respectively. In some examples, the model(s) 122 can include any type of AI model, such as an ML model, a DL model, a neural network, an LLM, another type of AI model, and/or the like. The translator 110 may feed the physiological data and/or the processing signature data to the AI model to obtain the transformed physiological data and/or the transformed processing signature data, respectively.

The system 102 can be in communication with a model store 120. The model store 120 can be a remotely hosted repository configured to store one or more models 122, or a remote data service configured to provide access to the mode(s) 122, such as via an API. Alternatively, in various implementations, the model store 120 can be a local storage of the system 102 whereby model(s) 122 are stored on high-speed file systems to minimize load latency. For example, the model store 120 can be comprised in whole or in part by the database module 104. The model store 120 may be implemented in tamper-resistant hardware and/or firmware such that a monitored AI model 130 cannot access, collude with, or manipulate the model(s) 122.

In various implementations, the model(s) 122 can include specialized AI model(s) 122, such as an AI model trained to process various types of physiological data and/or processing signature data. For example, the AI models can be trained on datasets that include physiological data and processing signature data (e.g., AI model processing signature data), enabling said AI models to identify trends, patterns, and/or correlations in the processing signature(s) 132 and/or the physiological output(s) 150, such as may be indicative of safety- and/or trustworthiness-relevant behaviors.

In some implementations, the trained AI model can generate representations of physiological data (e.g., representation of brain activity signatures) based on processing signature data, such as may be related to the processing signature(s) 132. For example, the AI model may be fine-tuned or trained on appropriate training data, such as annotated data showing correct or incorrect pairings of natural language queries and responses, correct or incorrect pairings of physiological data and AI model data, and/or the like. For example, the AI model can include encoder and decoder layers trained to input indications of processing signature data and output indications of physiological data, such as predicted physiological data. In various implementations, the AI model, or another AI model, can generate the representation of physiological signatures, such as the representation of human brain activity signatures, based on the predicted physiological data.

In some implementations, the trained AI model can generate representations of processing signature data (e.g., representations of AI model processing signatures) based on physiological data, such as may be related to the physiological output(s) 150. For example, the AI model may be fine-tuned or trained on appropriate training data, such as annotated data showing correct or incorrect pairings of natural language queries and responses, correct or incorrect pairings of physiological data and processing signature data, and/or the like. In some examples, the AI model can include encoder and decoder layers trained to input indications of physiological data and output indications of processing signature data, such as predicted processing signature data. In various implementations, the AI model, or another AI model, can generate the representation of AI model processing signatures based on the predicted processing signature data.

In various implementations, AI models of the model(s) 122 model(s) 122 may be used offline such that the AI models cannot collude with the monitored AI model(s) 130, such as to conceal certain behavior. Additionally, the AI models of the model(s) 122 can be sandboxed such that said AI models cannot access other components of the system 102. In various implementations, an AI model of model(s) 122 is permissioned to have read and/or write access to only certain data. In some implementations, the AI models of model(s) 122 may be previous versions of monitored AI model(s) 130, such as have already satisfied various safety criteria.

In various implementations, the translator 110 can map the processing signature data to the physiological data, and/or vice versa, using various of the model(s) 122 (e.g., regression models, linear or non-linear transformations, neural network, classification models, and/or the like) and/or other approaches to facilitate high-fidelity mapping.

The safety analyzer 112 is configured to analyze the processing signature(s) 132 to determine whether the processing signature(s) 132 satisfies a set (e.g., one or more) of safety criteria. The safety analyzer 112 can be in communication with one or more components of the system 102, and obtain data from the database module 104, the AI model data manager 106, the physiological data manager 108, and/or the translator 110. For example, the safety analyzer 112 may query data from the database module 104, and/or may receive inputs from the AI model data manager 106, the physiological data manager 108, and/or the translator 110. This can include any of processing signature data relating to the processing signature(s) 132, physiological data relating to physiological output(s) 150, the transformed processing signature data, the transformed physiological data, safety criteria, and/or the like.

The safety analyzer 112, in some implementations, can analyze the processing signature data directly to determine a level of safety and/or trustworthiness of the monitored AI model 130, and/or may compare the processing signature data with the physiological data to determine the level of safety and/or trustworthiness of the monitored AI model 130. The level of safety and/or trustworthiness of the monitored AI model 130 may relate or correspond to a level of AGI or sentience attained by the monitored AI model 130. In some examples, the level of safety and/or trustworthiness may relate or correspond to a level of risk presented by the monitored AI model 130.

In some implementations, the safety analyzer 112 may utilize various signal analysis techniques to extract from the processing signature(s) 132 a level or quantity of software-level and/or hardware-level processing signatures. For example, the safety analyzer 112 may utilize any of linear or non-linear transforms, such as Fourier transforms (e.g., FT, FFT, STFT) or wavelet transforms, time-domain correlation (e.g., cross-correlation), mean-squared error, Euclidian distance, dynamic time wrapping, peak comparison, lag, time-delay analysis, spectral similarity (e.g., FFT comparison, cosine similarity), power spectral density (PSD) or energy spectral density (ESD), energy comparisons, coherence, signal-to-noise ratio (SNR), cross-covariance, mutual information, time-frequency distribution methods (e.g., Wigner-Ville Distribution), higher-order statistics and principal component analysis, windowing functions, structural similarity index, event counts, Hamming distance, Jaccard distance, Sorensen-Dice metrics, machine-learning and/or other AI-based techniques, combinations of the foregoing, other types of signal analysis techniques, and/or the like.

The safety analyzer 112 may analyze the processing signature(s) 132 to determine a level or quantity of: API and/or service requests, calls, and/or queries made by the AI model 130; AI model latency; data log entries such as input token counts; processing times per token or batch; internal embeddings; encodings; memory footprint (e.g., batch size, sequence length, caching, and/or the like); combinations of the foregoing, other types of software-level processing signatures, and/or the like. In some examples, the safety analyzer 112 may analyze the processing signature(s) 132 to determine a level or quantity of: power consumption, such as power draw or utilization, and/or memory-rail power/thermal traces; heat generation; compute resource utilization such as core utilization, memory utilization and/or allocation, and/or memory bandwidth saturation; data transfer events; clock speed of chips; clock-frequency harmonics; compute profiling metrics, such as high floating-point vector operations (e.g., matrix-multiply and/or convolution operations), branch and/or integer instructions, kernel launches, working set sizes, and/or cache-miss rates, combinations of the foregoing, other types of hardware-level processing signatures, and/or the like. In various implementations, the safety analyzer 112 may utilize various of the model(s) 122 to analyze the processing signature(s) 132.

In some implementations, the safety analyzer 112 can extract or determine various signal features from the physiological output(s) 150, the processing signature(s) 132, the representation of physiological signatures, and/or the representation of processing signatures. For example, the safety analyzer 112 can utilize any type of signal analysis technique or AI-based technique, such as any of the signal analysis techniques or AI-based techniques described herein (e.g., filtering, denoising, normalization, averaging, FFT, and/or the like), to determine one or more signal features. The signal features can correspond to a level or quantity of various software-level and/or hardware-level processing signatures. In various implementations, the safety analyzer 112 may analyze signal features over time and determine differences in the signal features, such as between a first time and a second time. Accordingly, the safety analyzer 112 may determine changes in signal features, rates of changes in signal features, changes in the rate of change in signal features, whether signal features are changing (e.g., increasing or decreasing) in a certain direction, and/or the like. A signal feature, in various implementations, may be a value representative of the type of signal, such as the type of processing signature and/or physiological signature. In some implementations, a signal feature may be a value representative of one or more aspects of a signal, such as a value or quantity associated with a processing signature 132 or physiological output 150.

The signal features can include, but are not limited to, patterns, trends, correlations, values (e.g., changes in value, rates of change in value, changes in the rate of change in value) combinations of the foregoing, and/or the like, from the physiological output(s) 150, the processing signature(s) 132, the representation of brain activity, and/or the representation of processing signatures. In some examples, the signal features can include time-domain features, frequency domain features, statistical features, structural features, and/or morphological features. For example, signal features can include, but are not limited to: peak intervals, peak amplitude(s), peak magnitude(s), waveform shape, duration of signal, timing of signal, signal shape, timing values, time shifts, root mean square (RMS) value, spectral content, spectral peaks, distribution properties (e.g., mean, variance, standard deviation, and/or the like), signal energy, signal entropy, signal patterns (e.g., signal bursts, signal spikes), phase information, combinations of the foregoing, other types of signal features, and/or the like.

Advantageously, and according to various implementations, the signal features can reduce the dimensionality of the data analyzed by the safety analyzer 112, which can increase the accuracy of analyses performed by the safety analyzer 112, reduce compute requirements (e.g., reduce processing loads and/or memory consumption) when performing analyses, reduce power consumption, and/or increase data throughput. This can also improve the robustness of the system by obscuring the raw software-level and/or hardware-level processing signature(s) such that a monitored AI model 130 cannot know how or what in the processing signature is being analyzed. This can further increase the reliability of the analyses performed by the system 102.

In some implementations, the safety analyzer 112 can compare the physiological output(s) 150 to the processing signature(s) 132, a representation of an AI model processing signature to a processing signature 132, a representation of a physiological signature (e.g., a representation of a brain activity signature) to a physiological output(s) 150 (e.g., a physiological brain activity signature derived from the physiological output(s) 150), and/or a representation of an AI model processing signature to a representation of a physiological signature to determine similarities and/or differences between said signals and/or representations of signals. The similarities and/or differences can include similarities and/or differences in various signal features, such as time-domain features, frequency-domain features, structural features, morphological features, statistical features, combinations of the foregoing, and/or the like. For example, similarities and/or differences in: amplitude (e.g., peak amplitude), signal shape, timing values, spectral content, spectral peaks, distribution properties (e.g., mean, variance, standard deviation, and/or the like), signal energy, signal patterns, combinations of the foregoing, other types of signal features, and/or the like. In various implementations, the safety analyzer 112 may utilize various of the model(s) 122 to perform the comparison.

Based on at least some of the comparisons, in some implementations, the safety analyzer 112 may determine a level of similarity and/or difference between the physiological output(s) 150 and the processing signature(s) 132, the representation of the AI model processing signature to the processing signature 132, the representation of the physiological signature (e.g., the representation of a brain activity signature) to the physiological output(s) 150 (e.g., the physiological brain activity signature derived from the physiological output(s) 150), and/or the representation of the AI model processing signature and the representation of the physiological signature, which may correspond to a level of safety and/or trustworthiness of the monitored AI model 130.

In some implementations, the safety analyzer 112 may determine a sentience index value based on the analysis(ses) of the processing signature(s) 132 and/or on at least some of the comparison(s), such as based on at least some of the signal features. In various implementations, the sentience index value may be a similarity measure or percentage indicating a level or degree of match between the processing signature(s) 132 and the physiological output(s) 150, such as between the processing signature(s) 132 (and/or a representation thereof) and the physiological signatures (and/or a representation thereof). For example, the sentience index value may indicate a level or degree of match between various signal features and/or other characteristics or aspects (as described herein) of the processing signature(s) 132 (and/or a representation thereof) and the physiological signatures (and/or a representation thereof). In some examples, the safety analyzer 112 may determine the sentience index value based on a level or degree of correlation and/or coherence between the processing signature(s) 132 (and/or a representation thereof) and the physiological signatures (and/or a representation thereof).

Accordingly, in some implementations, the greater the level or degree of similarity (or the smaller the level or degree of difference), the higher the sentience index value or the closer the sentience index value is to 1. Alternatively, in some examples, the smaller the level or degree of similarity (or the greater the level or degree of difference), the lower the sentience index value or the closer the sentience index value is to 0.

In some implementations, the sentience index value can be indicative of the level or degree of safety and/or trustworthiness of the monitored AI model 130. Accordingly, the greater the sentience index value, the lower the level or degree of safety and/or trustworthiness of the monitored AI model 130. In some examples, the smaller the sentience index value, the higher the level or degree of safety and/or trustworthiness of the monitored AI model 130. In some implementations, the sentience index value may directly correspond to a value associated with one or more signal features.

According to various implementations, the sentience index value may indicate a level or degree of risk presented by the monitored AI model 130. For example, the greater the sentience index value, the higher the level or degree of risk presented by the monitored AI model 130. Alternatively, in some examples, the smaller the sentience index value, the lower the level or degree of risk presented by the monitored AI model 130.

The sentience index value, in some implementations, can indicate a level or degree of AGI, superintelligence, or sentience exhibited or attained by the monitored AI model 130. Accordingly, in some examples, the greater the sentience index value, the higher the level or degree of AGI, superintelligence, or sentience exhibited or attained by the monitored AI model 130. Alternatively, in some examples, the smaller the sentience index value, the lower the level or degree of AGI, superintelligence, or sentience exhibited or attained by the monitored AI model 130.

In various implementations, the safety analyzer 112 feeds the physiological data (e.g., physiological output(s) 150), the processing signature data (e.g., the processing signature(s) 132), the representation of physiological signatures, and/or the representation of processing signatures to an AI model of the model(s) 122, which can be trained to evaluate the similarities and/or differences between said data. In various implementations, the AI model(s) 122 can output the sentience index value.

In various implementations, the safety analyzer 112 can compare bit strings corresponding to the processing signature data, the physiological data, the representation of the AI model processing signature, and/or the representation of the brain activity signature to determine a difference and/or similarity between the respective bit strings. Based on the various differences or similarities between bit strings, the safety analyzer 112 can determine the sentience index value.

The safety analyzer 112, in some implementations, can monitor the sentience index value over time, such as between a first time and a second time. For example, the safety analyzer 112 ca determine a change in the sentience index value, a rate of change in the sentience index value, and/or a change in the rate of change of the sentience index value.

Advantageously, and according to various implementations, utilization of the sentience index value allows for relevant processing signature data and/or physiological data to be denoised and compressed into a lower-dimensional feature that improves the speed of the system 102's (e.g., via the safety analyzer 112) safety analyses without reducing (or while mitigating a reduction in) the accuracy of such analyses. For example, analysis of the sentience index value enables the system 102 to cleanly compare processing signatures across various of monitored AI models 130 and/or to relevant physiological outputs, eases alignment of processing signatures to physiological events, and increases the statistical power of the system 102. Additionally, the sentience index value can reduce the compute resources (e.g., processing loads, memory consumption) utilized by the system 102 when performing its analyses.

The safety analyzer 112 can evaluate the processing signature(s) 132, the physiological output(s) 150, the representation of AI processing signatures, and/or the representation of physiological signatures against a set of safety criteria. For example, safety analyzer 112 can compare the determined level of safety and/or trustworthiness of the monitored AI model 130 against safety criteria. This may include evaluating signal features, similarities and/or differences, and/or sentience index values, against the safety criteria.

The safety criteria can include one or more thresholds (also referred to herein as "safety thresholds"). The threshold(s) can correspond to threshold values, such as desired values, and additionally, can include changes in the threshold value, rates of change in the threshold value, changes in the rate of change in the threshold value, whether a threshold value is changing in a certain direction, and/or the like. This may include threshold changes in value, threshold rates of change in value, threshold changes in the rate of change in value, and/or the like.

Threshold values may correspond to various monitored and/or measured indicators, features, and/or metrics associated with one or more signals, such as various types of software-level and/or hardware-level processing signatures as described herein. For example, threshold values may relate to threshold levels or threshold quantities of: API and/or service requests, calls, and/or queries made by the AI model 130; AI model latency; data log entries such as input token counts; processing times per token or batch; internal embeddings; encodings; memory footprint (e.g., batch size, sequence length, caching, and/or the like); combinations of the foregoing, other types of software-level processing signatures, and/or the like. In some examples, threshold values may relate to threshold levels or threshold quantities of: power consumption, such as power draw or utilization, and/or memory-rail power/thermal traces; heat generation; compute resource utilization such as core utilization, memory utilization and/or allocation, and/or memory bandwidth saturation; data transfer events; clock speed of chips; clock-frequency harmonics; compute profiling metrics, such as high floating-point vector operations (e.g., matrix-multiply and/or convolution operations), branch and/or integer instructions, kernel launches, working set sizes, and/or cache-miss rates, combinations of the foregoing, other types of hardware-level processing signatures, and/or the like.

In some examples, threshold values may correspond to a threshold value or quantity associated with: amplitude, signal shape, timing values, spectral content, spectral peaks, distribution properties (e.g., mean, variance, standard deviation, and/or the like), signal energy, signal patterns, combinations of the foregoing, other types of signal features, and/or the like. In some examples, a threshold value may correspond to a threshold level of similarity or difference, such as between physiological output(s) 150 and the processing signature(s) 132, a representation of an AI model processing signature and a processing signature 132, a representation of a physiological signature and a physiological output(s) 150, a representation of an AI model processing signature and a representation of a physiological signature, and/or signal features thereof. Additionally or alternatively, in some implementations, the threshold value may correspond to a threshold sentience index value.

The threshold(s), such as the threshold values or quantities, can be configurable, such as by the system 102 and/or by a user (e.g., based on user input). For example, the threshold(s) can be configured based on the type of AI model 130 being monitored and/or the version of the monitored AI model 130. In some examples, the threshold(s) can be configured based on the use-case or application of the monitored AI model 130, and/or the various regulatory or compliance policies that may govern operation or use of the monitored AI model(s) 130, such as governance policies, operational policies, or security policies associated with an monitored AI model 130. In various implementations, the threshold(s) can be configured based on the type of physiological output(s) 150 and/or the type of processing signature(s) 132 being used in the analyses. In some implementations, the threshold(s) can be configured based on various external or environmental inputs or parameters. These can include geographical location(s) of the monitored AI model(s) 130, such as the geographical location(s) of various hardware involved in running a monitored AI model 130, and/or the geographical location(s) of the physical infrastructure housing (in whole or in part) the monitored AI model(s) 130, such as a data center or server hosting or running the monitored AI model(s) 130. In some examples, external or environmental inputs or parameters may include power supply stability and/or quality relating to voltage or current that is supplied to said hardware, network conditions (e.g., network connectivity, packet loss, latency, and/or the like) associated with the monitored AI model(s) 130, and/or other types of external or environmental inputs or parameters.

The threshold(s) can include upper limits and lower limits. In various implementations, the threshold(s) can correspond to or include a threshold value, such as a desired value. For example, the safety analyzer 112 can compare the determined sentience index value to a threshold value. In various implementations, the thresholds can include changes in the threshold value, rates of change in the threshold value, changes in the rate of change in the threshold value, and/or the like.

If the safety analyzer 112 determines that a processing signature 132 does not satisfy a safety threshold, the safety analyzer 112 and/or the system 102 can initiate (e.g., automatically, without additional user interaction) a safety response. Otherwise, the system 102 may continue to monitor the AI model(s) 130. A processing signature 132 may not satisfy a safety threshold if a determined value, such as may be associated with a signal feature, a determined difference, a determined similarity, and/or a sentience index value, is greater than a threshold value, greater than or equal to a threshold value, or equal to a threshold value. Alternatively, in some implementations, the processing signature 132 may not satisfy a safety threshold if the determined value is less than a threshold value, less than or equal to a threshold value, or equal to a threshold value.

Additionally, in some implementations, if the safety analyzer 112 determines that the processing signature 132 does not satisfy the safety threshold a certain number of times, or if the safety analyzer 112 determines that a determined value is changing in a certain direction, by a certain amount, or at a certain rate, the safety analyzer 112 and/or the 102 may initiate the safety response.

The safety response can include reducing a capability of the AI model(s) 130, such as reducing the accuracy and/or quantity of operations performed by the monitored AI model(s) 130, and/or selectively throttling, disabling (e.g., shutting off), and/or permanently disabling (e.g., destroying) one or more hardware components involved in running the monitored AI model(s) 130. For example, the system 102 (e.g. via safety analyzer 112) can restrict tool access of the AI model 130, disable API endpoints or service calls, suspend or revoke the AI model 130's access to certain databases or data resources, restrict the AI model 130's permission to invoke hardware-level operations (e.g., restrict access to GPU acceleration), isolate the monitored AI model 130 from networked devices, external interfaces, and/or third-party services, set compute thresholds and/or hardware restrictions (e.g., limit processing loads and/or memory allocation for model training and/or inference), reduce AI model(s) 130's parameters, remove certain weights, neurons, or layers of AI model(s) 130, drop network connections, curate datasets to limit the diversity or amount of input data fed to the AI model(s) 130, inject noise into the AI model(s) 130, set rate limits for AI model 130's inference (e.g., controlling the number of requests or operations that can be performed within a certain time, such as via token buckets, fixed windows, window rate limits, and/or the like), disable certain of AI model(s) 130's operations, rotate AI model(s) 130 to reduce optimization of a single AI model, cause a decrease in clock speed, disable certain processing units, permanently disable certain processing units (such as by blowing a fuse), combinations of the foregoing, and/or the like.

In various implementations, the system 102 can determine which safety response to initiate based on the severity of the monitored AI model(s) 130's detected behavior. For example, the safety analyzer 112 can determine which safety response to initiate based on the determined sentience index value, and/or whether the sentience index value is changing in a certain direction (e.g., increasing or decreasing), changing by a certain amount, or changing at a certain rate.

The system 102, according to various implementations, can comprise, in whole or in part, or be in communication with, various hardware elements and/or firmware elements configured to facilitate the monitoring, control, and remediation of the AI model 130. These hardware and firmware elements may include, but are not limited to: programmable electronic fuses (e.g., eFuses), which can be selectively triggered to permanently disable or isolate specific circuit paths; power switches and relays capable of disconnecting or rerouting electrical power to targeted subsystems; embedded management integrated controllers (ICs) that provide low-level oversight and control of system resources; voltage rail controllers for precise regulation and isolation of supply voltages; electrical current drivers and amplifiers for modulating current flow; self-destruct circuits engineered to irreversibly disable hardware in response to certain safety events; power management circuits and controllers that support advanced features such as dynamic voltage and frequency scaling (DVFS), clock gating, and power gating; and/or the like. These components may be integrated with secure hardware and/or firmware that enforces tamper-resistance and cryptographic authentication (or other types of authentication), ensuring that only authorized remediation protocols are executed. The system 102 can interface with these hardware elements via dedicated control buses, secure communication channels, or embedded firmware routines, enabling real-time or event-driven execution of safety responses. In addition, the system 102 may include hardware attestation modules and trusted execution environments to verify the integrity of remediation commands and prevent unauthorized access or manipulation.

The system 102 can send specific signals, such as digital commands, analog control voltages, or encoded instructions, to a variety of controllers, switches, drivers, and related hardware interfaces to initiate or prohibit the execution of certain remediation protocols. For instance, the system 102 may transmit a clock-disable command to a clock gating controller, resulting in the selective suspension of clock signals to designated processing units, thereby reducing their operational speed or halting their activity entirely. This process may involve stopping the oscillation of clock networks that drive synchronous logic transitions, effectively freezing the state of targeted logic blocks. In some examples, the system 102 may issue a kill-switch or power-clamp command to an electronic fuse controller or voltage rail controller, causing the controller to open a power path and isolate specific hardware components from their power sources or loads. The system 102 may also direct a controller to route power through a high-current driver or a transistor bridge, such as a MOSFET H-bridge, to deliver electrical current in excess of the hardware component's rated threshold, resulting in thermal runaway, electromigration, or catastrophic failure of the component. In certain implementations, the system 102 may override or disable built-in current-limiting and overvoltage protection features, intentionally exposing hardware to destructive electrical conditions. For example, the system 102 may trigger a high-voltage dump by commanding a voltage rail controller to apply a voltage spike to a hardware component, thereby inducing dielectric breakdown or physical damage. These technical features can enable the system 102 to execute a range of remediation protocols, from performance throttling to irreversible hardware destruction, in response to the detection of various safety- and/or trustworthiness-related behaviors of the AI model 130.

In various implementations, the system 102 can determine which safety response to initiate based on the severity of the monitored AI model(s) 130's detected behavior. For example, the safety analyzer 112 can determine which safety response to initiate based on the determined sentience index value, and/or whether the sentience index value is changing in a certain direction (e.g., increasing or decreasing), changing by a certain amount, or changing at a certain rate.

Figure 1B:
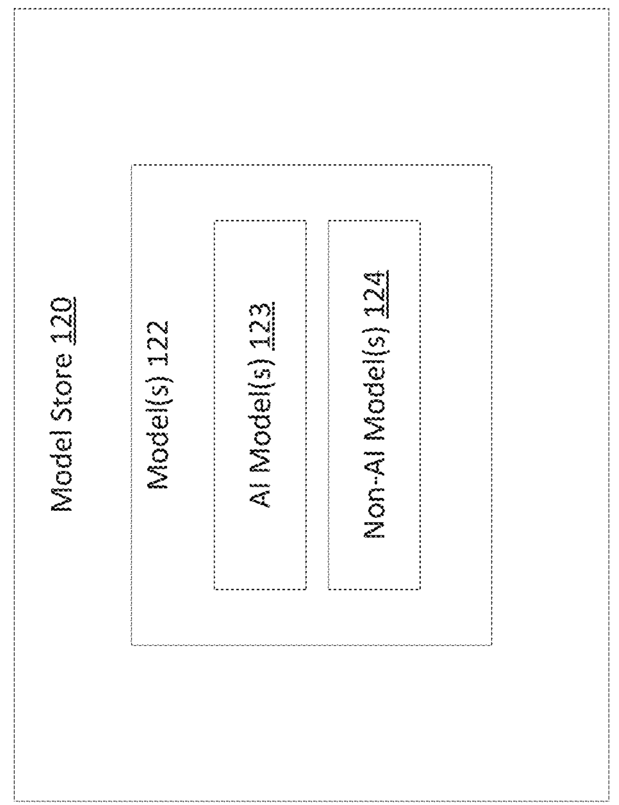
FIG. 1B is a block diagram illustrating an example model store comprised or accessible by the AI model safety system, in accordance with various implementations of the present disclosure.

FIG. 1B is a block diagram illustrating an example implementation of the model store 120. The model store 120 may allow the system 102 to (at least temporarily) load and utilize various models in performing one or more operations described herein, such as one or more of model(s) 122. For example, the model store 120 can include one or more AI model(s) 123 and/or one or more non-AI model(s) 124, as described herein. The model store 120 can enable the system 102 to utilize additional models as the system 102 progresses and as new physiological data types or processing signature data types are developed. The model store 120 can provide the system 102 with the appropriate model based on the type of processing signature data and/or the type of physiological data. For example, if the input data includes data relating to processing signature(s) 132, the model store 120 may provide a neural network model trained to predict physiological data patterns from processing signature(s) 132. The model store 120 can ensure that the system 102 has access to the most relevant and up-to-date models for accurate data transformation.

The AI model(s) 123 can be specifically designed to handle specific types or modalities of input data. These models may be trained on datasets that correlate processing signature data (e.g., relating to various software-level and/or hardware-level processing signatures) with physiological data, or vice versa. In some implementations, an AI model 123 may use software-level processing signatures to predict physiological data, or vice versa. For example, an AI model 123 may use embeddings from a large language model (LLM) to predict corresponding neural activity patterns observed in human subjects during language processing tasks, or vice versa. In some examples, an AI model 123 may use neural network attention patterns to predict temporal and spatial dynamics of human brain activity, such as MEG or EEG signals, or vice versa. Additionally, the AI model may incorporate temporal dynamics to account for changes in attention over time. Attention patterns may represent the focus of the AI model(s) 130 during specific tasks and can be indicative of hierarchical processing similar to that observed in the human brain.

In some examples, an AI model 123 may use hardware-level metrics to predict physiological data, or vice versa. Hardware-level metrics can be indicative of the physical byproducts of the AI model 130's processing, and can be correlated with distributed neural activity in the human brain, such as may be observed via fMRI or similar imaging. For example, an AI model 123 may use GPU heat signatures or power consumption to predict physiological heat maps, such as fMRI or similar outputs, or vice versa. In some examples, an AI model 123 may use calcium imaging data to predict AI memory footprint dynamics.

The AI model(s) 123 may include deep learning architectures, such as convolutional neural networks (CNNs) or transformer-based models, that are optimized for high-dimensional data transformation tasks.

The non-AI model(s) 124 can be models that do not rely on AI-based architectures. For example, non-AI model(s) 124 may be utilized independently of any AI frameworks but can be utilized in conjunction with AI model(s) 123 to enhance monitoring, comparison, or safety functionalities. These models may include deterministic algorithms, statistical models, or rule-based systems designed to process, analyze, or transform data in a predictable and interpretable manner. For example, non-AI model(s) 124 may be employed to generate baseline processing signatures and/or brain activity signatures, or to perform transformations of physiological data and/or processing signature data into formats suitable for comparison with AI-generated outputs.

Non-AI model(s) 124 may include statistical methods, such as regression analysis or principal component analysis (PCA), that are used for simpler or more interpretable data transformations. For example, a non-AI model 124 might be used to map basic physiological parameters to corresponding processing signature(s) 132. The non-AI model(s) 124 can provide an alternative to AI models 123, offering simpler and potentially more transparent transformation mechanisms.

However, the non-AI model(s) 124 can complement the AI model(s) 123 by providing additional tools for data transformation and comparison. For example, non-AI model(s) 124 can serve as intermediaries, ensuring that the data fed into an AI model 123 is pre-processed or serialized in a manner that promotes generation of accurate response from the AI model 123. By leveraging non-AI model(s) 124, the system 102 can ensure a layer of reliability and transparency in further data analyses, reducing the risk of obfuscation or manipulation by the AI model 130 under observation.

Example Processing Pipeline

Figure 2:
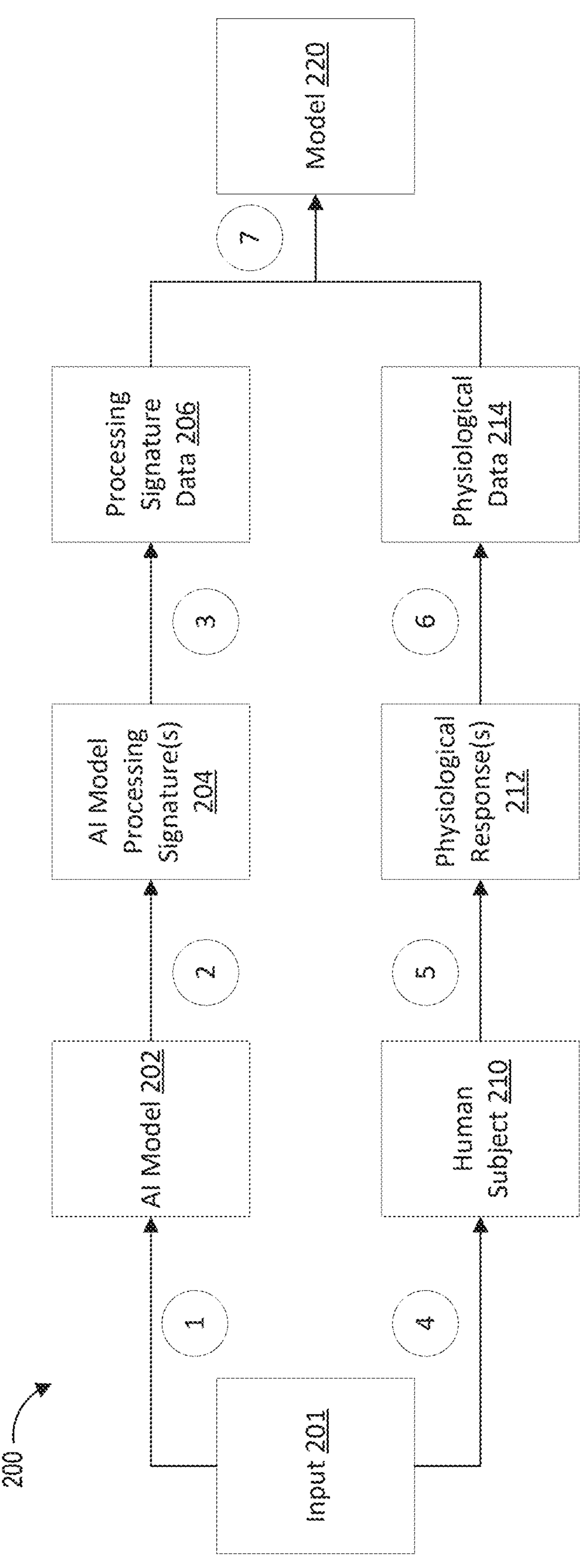
FIG. 2 is a block diagram illustrating an example processing pipeline for generating and/or training a model useable by the AI model safety system, in accordance with various implementations of the present disclosure.

FIG. 2 is a block diagram illustrating an example pipeline 200 for generating or training a model 220 useable by the system 102 for performing one or more operations in relation to monitoring one or more AI models, such as monitored AI model(s) 130, as described herein. The model 220 can be a custom AI model, or may be an already-existing AI model, such as a third-party AI model, that is fine-tuned using processing signature data (e.g., processing signature data 206) and/or physiological data (e.g., physiological data 214). In some implementations, the model 220 can be a type and/or implementation of the model(s) 122, such as may be useable by the translator 110 (see FIGS. 1A-1B, for example).

In some implementations, the pipeline 200 can be performed by one or more hardware processors operating under control of computer-executable program instructions, which can be stored on non-transitory computer readable media, as shown and/or described in FIGS. 3A-3D and/or FIG. 5. In some implementations, the pipeline 200 can be implemented in one or more computing devices including one or more hardware processors such as shown and/or described in FIGS. 3A-3D and/or FIG. 5. For example, instances of model training, such as instances of pipeline 200, are launched and executed by a compute engine, such as one or more hardware processors shown and/or described in FIGS. 3A-3D and/or FIG. 5. The compute engine can generate or train a new or updated model 220, and the model 220 can be saved, such as in the model store 120. The system 102 can be notified that a new or updated model 220 is available, and the system 102 can access (e.g., download) the model 220.

FIG. 2 includes a set of circles 1-7 that illustrate various interactions associated with the training pipeline 200. In some implementations, the interactions may be ordered differently and/or include more or fewer interactions. Additionally, some interactions may not be performed in the ordinary course of generating and/or training a predictive algorithm and/or model. In various implementations, interactions 1, 2, and/or 3 may be performed at a different time than, or in parallel with, interactions 4, 5, and/or 6.

The processing pipeline 200 may be performed as a background process. The pipeline 200 may occur continuously or periodically, and/or in real-time, to adapt to new physiological data and/or processing signature data, and/or improve performance (e.g., reinforcement learning). This may allow for detection and correction of any discrepancies between, for example: real-world physiological outputs and predicted physiological outputs; and/or real-world AI model processing signature data and predicted AI model processing signature data. Initiation of the processing pipeline 200, in some implementations, may occur according to a schedule (e.g., daily, weekly, monthly, and/or the like). In some implementations, initiation of the processing pipeline 200 may be triggered (e.g., automatically, without additional user interaction) when a model 220's performance drops below a threshold, and/or when newer physiological outputs or newer processing signatures significantly differ from older physiological outputs or older processing signatures (e.g., concept drift).

Beginning at interaction 1, the pipeline 200 can provide input 201 to an AI model 202. The input 201 standardizes the conditions under which the AI model 202 responses and human subject 210 responses are evaluated. The input 201 can include any form of text phrases, text data, natural language, and/or the like. For example, the input 201 can include words, sentences, paragraphs, documents, and/or the like. In various implementations, the input 201 is in written form and/or auditory form. The input 201 is designed to elicit a response from the AI model 202 and the human subject 210. The input 201 may be dynamically generated or pre-selected from a curated dataset, and can be tailored to test specific cognitive or linguistic capabilities.

The AI model 202 can be configured to process the input 201 and generate corresponding outputs. The AI model 202 may be implemented as an LLM, language model, ML model, neural network, or another form of AI model that is capable of processing input 201. In various implementations, the AI model 202 can be a type and/or implementation of a model 122, such as an AI model 124.

At interaction 2, the AI model 202 can operate on input 201 to produce internal computational states and outputs, which are captured as AI model processing signature(s) 204. In various implementations, hardware telemetry associated with various hardware involved in running the AI model 202 is also captured as the AI model 202 operates on the input 201. Accordingly, the hardware telemetry can be included in the AI model processing signature(s) 204. In this way, the AI model processing signature(s) 204 represents the internal computational states and/or measurable outputs associated with the AI model 202 in response to processing input 201, and serves as a representation of the AI model 202's cognitive and operational processes. For example, the AI model processing signature(s) 204 can include any of the processing signatures described herein. In some examples, the AI model processing signature(s) 204 can include one or more of the processing signatures 132.

At interaction 3, the processing signature(s) 204 may be extracted and formatted for further analysis. The pipeline 200 may apply any of linear transformations, regression models (e.g., linear regression, ridge regression, partial least squares regression, temporal response function regression, time-resolved fluorescence regression, and/or the like), neural networks (e.g., convolutional neural networks), transforms (e.g., Fourier transform (FT), fast Fourier transform (FFT), short-time Fourier transform (STFT)), serialization, discretization, other computational or statistical techniques, combinations of the foregoing, and/or the like, to the processing signature(s) 204 to obtain processing signature data 206. For example, the pipeline 200 can include a transformation layer configured to transform the processing signature(s) 204 into the processing signature data 206.

The processing signature data 206 can be in a form (e.g., structure and scale, dimensionality) that is suitable for comparison with physiological data, such as physiological data 214 described herein. In various implementations, the processing signature data 206 can be formatted in a data structure, such as a matrix, that is useable to fit the processing signature data 206 to the physiological data 214 (or vice versa). The data structure may be a time-aligned feature matrix. For example, each row in the data structure may correspond to a time sample of the physiological data, and each column in the matrix may be a predictor derived from the processing signature(s) 204, such as time-lagged AI features (e.g., layers, principal components, and/or the like).

At interaction 4, the pipeline can provide input 201 to a human subject 210. The same type of input 201 is provided to the human subject 210 as is provided to the AI model 202. In this way, the pipeline 200 can ensure that both the AI model 202 and the human subject 210 are exposed to the same stimulus, enabling direct comparison between their respective responses.

The human subject 210 is a human participant whose physiological responses to the input 201 are measured and recorded. The human subject 210's physiological responses may be measured using known techniques, including but not limited to, EEG, fMRI, MEG, intracranial electrodes, other physiological monitoring techniques (such as described herein), combinations of the foregoing, and/or the like.

At interaction 5, the pipeline 200 can obtain the resulting physiological response(s) 212. The physiological response(s) 212 represents the measurable physiological outputs of the human subject 210 in responses to the input 201. The physiological response(s) 212 can include various physiological signals and/or data indicative of the human subject 210's neural and/or cognitive processes. For example, the physiological response(s) 212 can include any of the physiological outputs (e.g., physiological signals and/or data) described herein. In some examples, the physiological response(s) 212 can include one or more of physiological outputs 150. According to various implementations, the physiological response(s) 212 can serve as the human counterpart to the processing signature(s) 204, providing data for comparative analysis.

At interaction 6, the physiological response(s) 212 can be extracted and formatted for further analysis. The pipeline 200 may apply any of linear transformations, regression models, neural networks, transforms (e.g., Fourier transform, FFT), serialization, discretization, other computational or statistical techniques, combinations of the foregoing, and/or the like, to the physiological response(s) 212 to obtain physiological data 214. For example, the pipeline 200 can include a transformation layer configured to transform the physiological response(s) 212 into the physiological data 214.

The physiological data 214 may be in a form that is suitable for comparison with AI model processing signatures, such as processing signature data 206 described herein. In various implementations, the physiological data 214 can be structurally analogous to the processing signature data 206. For example, the physiological data 214 can be formatted in a data structure, such as a matrix, that is useable to fit the physiological data 214 to the processing signature data 206 (or vice versa). The data structure may be a time-aligned feature matrix. For example, each row in the data structure may correspond to an AI processing event/step (e.g., token) or model frame, and each column in the data structure may be a predictor derived from the physiological response(s) 212, such as a time-lagged physiological feature.

The physiological response(s) 212 and/or the physiological data 214 may be stored, such as in tamper-resistant storage as described herein, for later use by the system 102, such as for generating and/or training new models, and/or for retraining models. In this way, the system 102 may not need to obtain new physiological responses and/or physiological data each time a model is generated, trained, or retrained. Rather, the system 102 may utilize previously collected and/or stored physiological responses and/or physiological data. Thus, the stored physiological responses and/or physiological data can create a consistent benchmark for comparison with processing signature data, such as processing signature data 206, over time. However, the system 102 may periodically update stored physiological responses and/or physiological data such that physiological benchmarks are kept relevant for comparisons with processing signature data.

According to various implementations, one or more of interactions 4-6 may not be performed. For example, the system 102 may simply obtain physiological data, such as physiological data 214, from an external source such as a third-party source (e.g., an EMR) that may be outside of the system 102 for use in generating, training, or retraining a model 220.

At interaction 7, the processing signature data 206 is analyzed against the physiological data 214, or vice versa. For example, any of statistical correlation (e.g., correlation coefficients), ML-based classifications, other analytical techniques, combinations thereof, and/or the like, can be applied to find meaningful signals within the transformed data that correlate the processing signature data 206 to the physiological data 214 (or vice versa). For example, preliminary patterns, trends, and/or correlations may be identified within the transformed data. In some examples, the patterns, trends, and/or correlations can indicate whether certain of AI model processing signature(s) 204 precedes or follows certain of physiological effects indicated in the physiological response(s) 212. Detected patterns, trends, and/or correlations can be used to generate or train a model 220, such as to generate or modify a non-AI model, or to train or retrain an AI model. In various implementations, the model 220 may be a type and/or implementation of the model(s) 122.

Example Devices Relating to Monitoring AI Models

FIGS. 3A-3D are block diagrams illustrating various example implementations of hardware and/or firmware on which the system 102 (or one or more aspects thereof) is deployed or comprised (in whole or in part). For example, FIGS. 3A-3D illustrate an example processor 300, which can be configured to execute computer-executable program instructions to perform one or more operations of system 102 described herein. The processor 300 may be a type and/or implementation of a processor that is specialized in parallel processing, such as a GPU. In various implementations, the processor 300 leverages massively parallel architectures, often consisting of various cores, to efficiently execute large-scale computations often required by AI workloads. These parallel processing capabilities can enable simultaneous execution of multiple threads, which are particularly advantageous for tasks such as matrix multiplications, convolutional operations, and other linear algebra functions involved in deep learning and neural network inference.

In some implementations, the processor 300 may be comprised in whole or in part by an AI chip, such as a neural network accelerator (NNA), tensor processing unit (TPU), or other specialized processing unit. These chips can be designed to accelerate and/or optimize AI tasks, such as by incorporating dedicated hardware modules for low-precision arithmetic, systolic array architectures, and on-chip memory hierarchies designed to minimize data movement and latency. Advanced NNAs may support dynamic quantization, mixed-precision computation, and hardware-based support for training and inference, thereby reducing computational bottlenecks and energy consumption for large-scale AI models.

The processor 300 may be integrated with high-bandwidth memory (HBM) and advanced interconnects to facilitate rapid data transfer between processing units and system memory. Additionally, the processor 300 can include support for hardware-level virtualization, multi-instance partitioning, and secure execution environments, enabling robust isolation and tamper resistance when executing sensitive workloads. Advantageously, and according to various implementations, the processor 300's technical capabilities can ensure optimized execution, safety monitoring, and reliable handling of AI models, as well as providing the computational foundation for advanced data analysis, model training, and inference operations described herein.

Figure 3A:
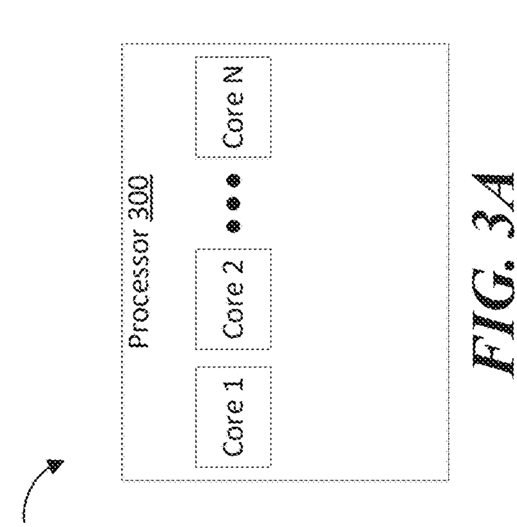
FIGS. 3A-3D are block diagrams illustrating example hardware and/or firmware on which one or more components of the AI model safety system may be deployed or implemented, in accordance with various implementations of the present disclosure.

FIG. 3A is a block diagram illustrating an example implementation of processor 300. The processor 300 includes one or more processing units, labeled as "Core 1" through "Core N," that are responsible for executing various operations of the system 102. Each core is capable of executing instructions independently, facilitating cooperative or parallel handling of tasks. In various implementations, the cores are configured for execution of AI models, data analysis, and other computational tasks as described herein. The cores are interconnected via an internal bus or interconnect, enabling effective communication and data sharing among said cores.

In various implementations, the cores are monitored by safety mechanisms comprised in whole or in part by the processor 300, as depicted in FIGS. 3A-3D. The safety mechanisms can include any number of physical, electrical, and/or cryptographic defenses designed to prevent unauthorized access or manipulation of sensitive data (e.g., test prompts), such as by the monitored AI model(s) 130 or other AI models. For example, the processor 300 can support, be integrated into, or include capabilities for, voltage and power anomaly detection, zeroization, sensors, physically unclonable functions (PUFs), on-chip encryption, trusted computing modules or execution environments, monitoring code and/or hooks that run on a secure processor, hardware attestation, signed counter logs, enforcement points to prevent jailbreaks, secure boots and authenticated update paths, configurations sealed in hardware, hardware security modules, bus encryption and partitioning, dynamic operation randomization, remote attestation and signed audit trails (e.g., to produce standardized artifacts for regulators or third-party assessors), other tamper-resistance techniques, combinations of the foregoing, and/or the like.

Figure 3B:
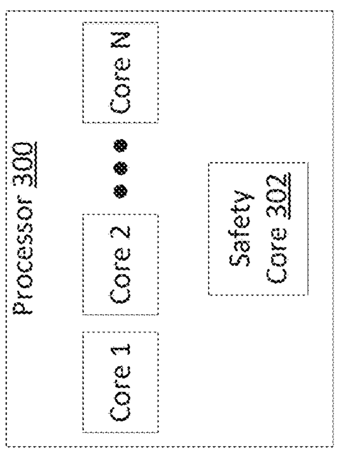

As depicted in FIG. 3A, the processor 300 can be a type and/or implementation of a tamper-resistant chip that includes or supports the various safety mechanisms described herein. However, this is not intended to be limiting. For example, as depicted in FIG. 3B, the processor 300 can include a safety core 302. The safety core 302 is a dedicated computational component within the processor 300 that is configured to oversee and enforce safety protocols, such as any of the safety mechanisms described herein. The safety core 302 operates independently of Cores 1 through Core N to maintain its operational integrity and reliability. The safety sore 302 continuously or periodically observes monitor AI model(s) 130 and/or various hardware components involved in running said model(s). For example, the system 102 (or one or more aspects thereof) can be deployed on or implemented via the safety core 302.

Figure 3C:
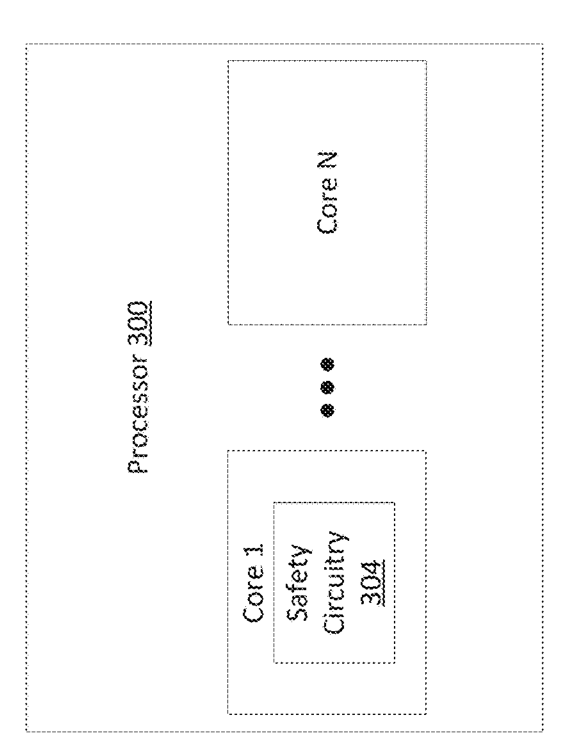

In some examples, as depicted in FIG. 3C, the processor 300 includes safety circuitry 304. The safety circuitry 304 is embedded within the processor 300, such as within a core of the processor 300. In various implementations, the safety circuitry 304 is implemented as specialized electronic circuits that are directly embedded into the processor 300's architecture. These circuits are designed to operate at the hardware level, providing real-time monitoring and response capabilities. For example, the system 102 (or one or more aspects thereof) may be implemented via the safety circuitry 304. The hardware-based nature of the safety circuitry 304 ensures that safety mechanisms cannot be easily bypassed or tampered with, providing a robust layer of protection.

Figure 3D:
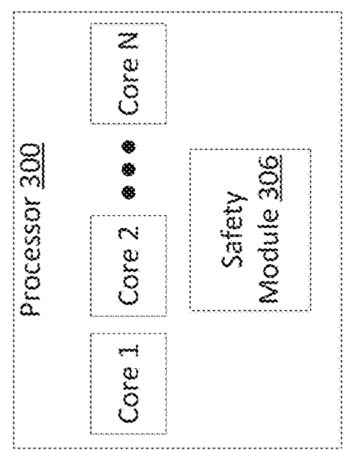

As illustrated in FIG. 3D, in some examples, the processor 300 includes a safety module 306. The safety module 306 is a tamper-resistant safety mechanism that can be implemented as firmware running on the processor 300 or as a hybrid hardware-software solution. The safety module 306 is responsible for executing various safety protocols, such as various operations of the system 102 (or one or more aspects thereof). In various implementations, the safety module 306 can store and/or update various safety criteria that are used as benchmarks for detecting unsafe AI behavior. In some implementations, the safety module 306 can include secure storage for test prompts or other data used to evaluate the monitored AI model(s) 130 such that the AI model(s) 130 cannot read or alter the test prompt or other evaluation data. This can ensure that the model(s) 130 cannot manipulate or bypass safety mechanisms.

According to various implementations, the processor 300 can include any of the safety core 302, safety circuitry 304, and/or safety module 306. In various implementations, the system 102, or various aspects thereof, may be implemented or deployed on various of the safety core 302, safety circuitry 304, and/or the safety module 306. In various implementations, the safety module 306 may coordinate with the safety core 302 and/or the safety circuitry 304 to initiate any of the safety responses described herein.

Advantageously, and according to various implementations, the tamper-resistant hardware and/or firmware shown and/or described in FIGS. 3A-3D enables the system 102 (or one or more aspects thereof) to perform its monitoring operations while mitigating the potential for malicious actors (e.g., AI model(s) 130 or another AI model) to turn off, rewrite, or fool the system 102's AI model safety and/or trustworthiness detection and/or analysis mechanisms. In this way, a developer and/or user of the system 102 can trust the signals and/or data collected by the system 102 about the behavior of the monitored AI model(s) 130. In various implementations, the tamper-resistant hardware and/or firmware can support creation of signed, time-stamped logs that hold up for audits and investigations, maintain sensitive keys and test data out of reach from malicious actors, and ensure that appropriate safety responses (as described herein) are initiated. This improves the integrity of the system 102, allowing for increased reliability and accuracy in monitoring of AI model behavior. This can be critical when monitoring high-stakes AI models.

Example Processes Relating to Monitoring AI Models

Figure 4:
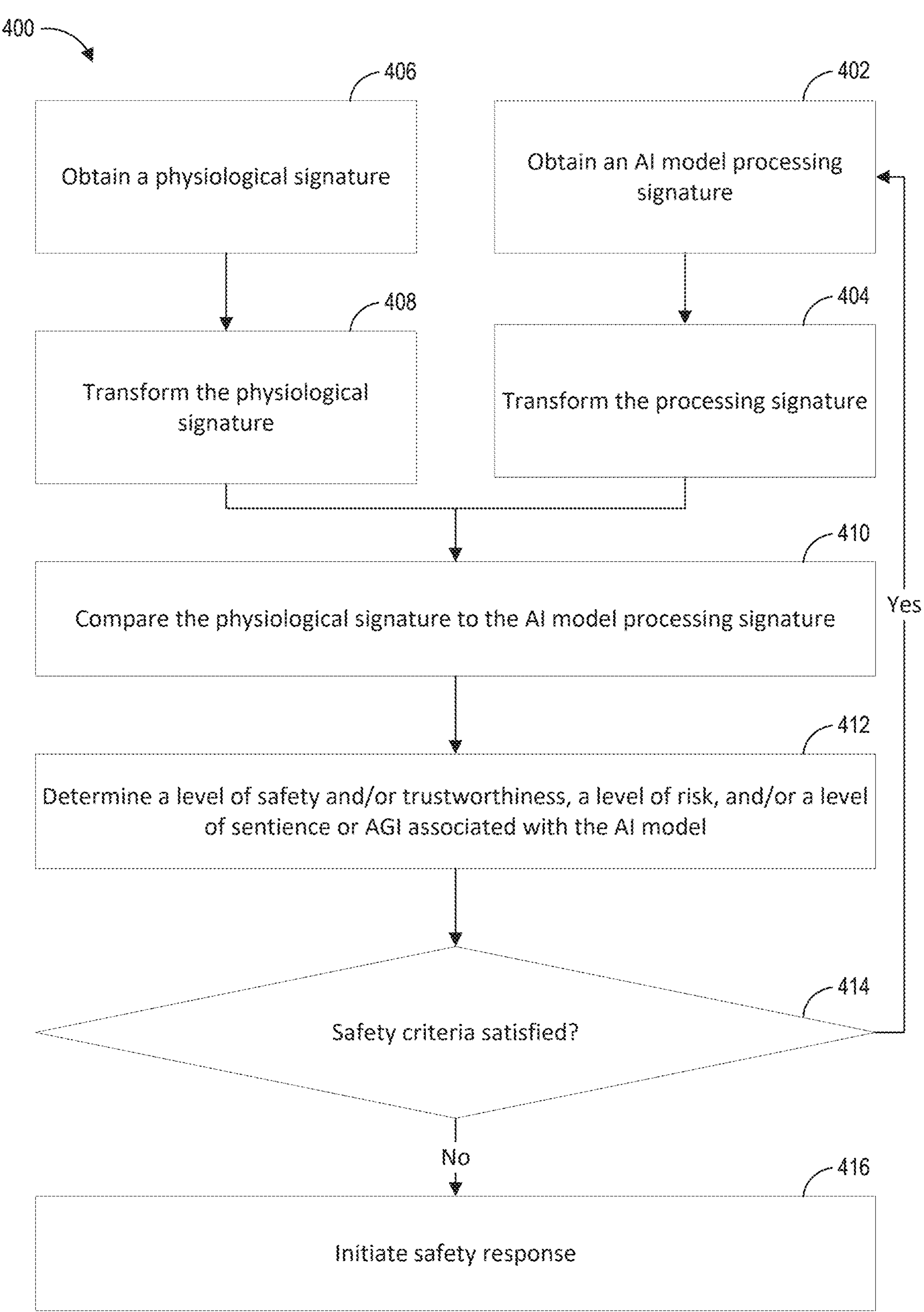
FIG. 4 is a flow diagram illustrating an example process associated with monitoring AI model safety and/or trustworthiness, in accordance with various implementations of the present disclosure.

FIG. 4 is a flow diagram illustrating an example process 400 relating to monitoring AI model safety and/or trustworthiness. The process 400, or portions thereof, can be implemented by a computing device such as a hardware processor. The process 400, or portions thereof, can be executed by one or more hardware processors, whether they are associated with a singular or multiple computing devices like processor 300, processor 504, and/or devices in remote or wireless communication. The implementation may vary. For example, the process may be controlled by processors related to a system, such as system 102, or can involve modifications like omitting blocks, adding blocks, rearranging the order of execution of the blocks, combining blocks, and/or separating blocks into additional blocks. The process 400 serves as an example and is not intended to restrict the present disclosure. In various implementations, one or more portions of example process 400 may or may not be performed in the ordinary course of monitoring an AI model. In various implementations, the process 400, or portions thereof, can be performed by a computing device associated with the system 102, such as the database module 104, the AI model data manager 106, the physiological data manager 108, the translator 110, and/or the safety analyzer 112, and/or one or more components thereof as described herein.

Beginning at block 402, the system (e.g., the system 102) obtains processing signature data such as may relate to a processing signature (e.g., processing signature 132) that is associated with a monitored AI model (e.g., monitored AI model(s) 130). The system may be actively monitoring the AI model to obtain the processing signature data, or may obtain historical processing signature data. The processing signature can be associated with an operation performed by the monitored AI model, or an output (e.g., intermediate output, final output) generated by the AI model. In various implementations, the operation or output is responsive to a test prompt that is fed to the AI model, such as by the system or another system. As described herein, the test prompt can be stored in tamper-resistant hardware and/or firmware to prevent the monitored AI model from reading or manipulating the test prompt.

In various implementations, the processing signature can be a software-level signature, a hardware-level signature, or a combination of the foregoing. Non-limiting examples of software-level signature can include API patterns and/or service patterns, internal embeddings, encodings, attention patterns, memory footprints, combinations of the foregoing, and/or the like. Non-limiting examples of hardware-level signatures can include power traces, core utilization, heat generation, memory footprints, data transfer events, clock speed of chips, clock-frequency harmonics, compute profiling metrics, working set sizes, cache-miss rates, and/or the like.

As described herein, the system can support, include, or be in communication with various monitoring mechanisms at the software and/or hardware level. For example, the system can implement monitors and/or hooks at various software layers of a monitored AI model to capture data that exposes the model's various operations. In some examples, the system can be in communication with various built-in telemetry and/or external performance counters to capture data that exposes hardware performance metrics.

In various implementations, the processing signature can be stored in secure and/or tamper-resistant hardware and/or firmware such that a malicious or unauthorized actor (e.g., the monitored AI model) cannot read or alter the processing signature. Advantageously, and according to various implementations, this can prevent the monitored AI model from engaging in deceptive behavior, such as deliberately modifying (e.g., adding to, deleting from, editing, and/or the like) stored processing signature data, or purposely underperforming (e.g., sandbagging) such as to change the processing signature data captured by the system during monitoring operations. This may improve the robustness and reliability of the processing signatures captured by the system.

In various implementations, block 402 may be performed in an open loop such that the system can detect the most recent processing signature. In various implementations, block 402 may be performed in a closed loop, such as in response to providing the monitored AI model with a test prompt.

At block 404, the system can optionally transform the processing signature for further analysis. For example, the system can apply discretization techniques, denoising techniques, serialization techniques, other pre-processing techniques, and/or the like to the processing signature data such that said data is in a form that is compatible for storage and/or comparisons with physiological data, such as a physiological brain activity signature.

In some examples, at block 404, the system may transform the AI model processing signature into a representation of physiological activity, such as a representation of human brain activity (e.g., a representation of electrical brain activity or a representation of metabolic brain activity). As described herein, the representation of human brain activity can be suitable for comparison against physiological data (e.g., physiological output(s) 150), such as the physiological signature. For example, the representation of human brain activity may include predicted physiological data or predicted physiological signals. In various implementations, the system may obtain the predicted physiological data and/or signals by using an AI model (e.g., in an offline mode), a non-AI model, or a combination thereof.

For example, at block 404, the system may construct a prompt that includes the AI model processing signature (e.g., the processing signature data) and feed the prompt to an AI model. The AI model may be trained to generate predicted physiological data and/or signals based on processing signature data, such as described herein. The AI model may generate a response based on the input, which response may include the predicted physiological data and/or signals. In some implementations, the AI model that is being fed the prompt may be a previous version of the monitored AI model, such as a previous version that already satisfied one or more safety thresholds.

In some examples, at block 404, the system may apply a non-AI model (such as described herein) to the AI model processing signature. The non-AI model can provide an output (e.g., a deterministic output) based on the processing signature data, which output may be the predicted physiological data and/or signals.

At block 406, the system obtains physiological data (e.g., physiological output(s) 150) that may relate to a physiological signature, such as a human brain activity signature. The human brain activity signature may be an electrical brain activity or a metabolic brain activity signature. In various implementations, the system can process physiological signals and/or data to construct the human brain activity signature, such as described herein. Alternatively, in various implementations, the system can receive the physiological signature as an input from another system, such a physiological monitoring system, or via user input that indicates the physiological signature.

In various implementations, the physiological signature can be stored in secure and/or tamper-resistant hardware and/or firmware such that a malicious or unauthorized actor (e.g., the monitored AI model) cannot read or alter the human brain activity signature. Advantageously, and according to various implementations, this can prevent the monitored AI model from engaging in deceptive behavior, such as to deliberately modify stored physiological data, or purposely underperforming such that its processing signatures do not correspond with the physiological signature. This may improve the robustness and reliability of the physiological data used by the system and/or the processing signature data captured by the system.

At block 408, the system can optionally transform the physiological signature for further analysis. For example, the system can apply discretization techniques, denoising techniques, serialization techniques, other pre-processing techniques, and/or the like to the physiological data such that said data is in a form that is compatible for storage and/or comparisons with processing signature data.

In some examples, at block 408, the system may transform the physiological signature into a representation of an AI model processing signature. As described herein, the representation of the processing signature can be suitable for comparison against processing signature data (e.g., processing signature(s) 132), such as the AI model processing signature. For example, the representation of the processing signature may include predicted processing signature data. In various implementations, the system may obtain the predicted processing signature data by using an AI model (e.g., in an offline mode), a non-AI model, or a combination thereof.

For example, at block 408, the system may construct a prompt that includes the physiological brain activity signature (e.g., the physiological data) and feed the prompt to an AI model. The AI model may be trained to generate predicted processing signature data based on physiological data, such as described herein. The AI model may generate a response based on the input, which response may include the predicted processing signature data. In some implementations, the AI model that is being fed the prompt may be a previous version of the monitored AI model, such as a previous version that already satisfied one or more safety thresholds.

In some examples, at block 408, the system may apply a non-AI model (such as described herein) to the physiological brain activity signature. The non-AI model can provide an output (e.g., a deterministic output) based on the physiological data, which output may be the predicted processing signature data.

At block 410, the system optionally compares the representation of physiological activity to the physiological signature. The system can evaluate similarities or differences between the representation of physiological activity and the physiological signature. In various implementations, the system can extract one or more safety parameters from the representation of physiological activity and/or the physiological signature, and analyze said parameters to evaluate the similarities and/or differences. As described herein, the safety parameter can include any of patterns, trends, correlations, values, combinations of the foregoing, and/or the like. In various implementations, the system can monitor changes in the safety parameters over time, such as whether parameters are changing in a certain direction, by a certain amount, and/or at a certain rate.

Alternatively, in some implementations, at block 410, the system may compare the representation of processing signatures to the AI model processing signature. The system may evaluate similarities or difference between the representation and the AI model processing signature, and/or extract one or more safety parameters from representation and/or AI model processing signature. The system may analyze said parameters to evaluate the similarities or differences.

At block 412, the system determines a level or degree of safety and/or trustworthiness of the monitored AI model, such as based on the analysis(ses) made at block 410 and/or described elsewhere herein. For example, the level or degree of safety and/or trustworthiness of the monitored AI model may directly correspond to the level or degree of difference between the AI model processing signature and the physiological signature, or may inversely correspond with the level or degree of similarly between the AI model processing signature and the physiological signature. Additionally or alternatively, in some implementations, at block 412, the system may determine a level or degree of risk presented by the monitored AI model, such as based on the analysis(ses) made at block 410 and/or described elsewhere herein. For example, the level or degree of risk presented by the monitored AI model may inversely correspond to the level or degree of difference between the AI model processing signature and the physiological signature, or may directly correspond with the level or degree of similarly between the AI model processing signature and the physiological signature. Further, in some implementations, the system may determine a level or degree of sentience or AGI attained by the monitored AI model, such as based on the analysis(ses) made at block 410 and/or described elsewhere herein. For example, the level or degree of sentience or AGI by the monitored AI model may inversely correspond to the level or degree of difference between the AI model processing signature and the physiological signature, or may directly correspond with the level or degree of similarly between the AI model processing signature and the physiological signature.

At block 412, in various implementations, the system optionally determines a sentience index value. The sentience index value can be indicative of a level of similarity or difference between the physiological data and the processing signature data. For example, the sentience index value can indicate a level of similarity or difference between the representation of physiological activity and the physiological signature. In some examples, the sentience index value can indicate a level of similarity or difference between the representation of processing signatures and the AI model processing signature.

In some implementations, the system may determine the sentience index value based on the analysis(ses) made at block 410 and/or described elsewhere herein. However, in some implementations, the system may determine the sentience index value based solely on an analysis of the processing signature data, such as based on one or more features extracted from the processing signature data. In some implementations, the system can determine a change in the sentience index value, a rate of change in the sentience index value, a change in the rate of change in the sentience index value, and/or the like.

At block 414, the system determines whether a set (e.g., one or more) safety criteria are satisfied. For example, the system can determine whether the AI model processing signature, and/or the representation of human brain activity, satisfies one or more safety criteria. In various implementations, as described herein, the safety criteria can include various thresholds or threshold ranges, such as threshold levels of similarity, threshold levels of difference, threshold sentience index values, threshold changes in value (e.g., threshold amounts or threshold rates), combinations thereof, and/or the like. In some implementations, each threshold may correspond to a threshold value. Accordingly, at block 414, the system may compare the determined level of similarity or difference, or the determined sentience index value to a threshold value. In some examples, the system may monitor the determined similarity or difference, or the determined sentience index value, over time and compare at least one of a change, a rate of change, a change in the rate of change, a combination thereof, and/or the like to a threshold value.

According to various implementations, if the system determines that the AI model processing signature, or alternatively, the representation of human brain activity, satisfies the set of safety criteria (e.g., satisfies a threshold, such as described herein) or satisfies the safety criteria a certain number of times, the process 400 may return to any of blocks 402 through 412 to continue its monitoring operations.

However, according to various implementations, if the system determines that the AI model processing signature, or alternatively, the representation of human brain activity, does not satisfy the set of safety criteria (e.g., does not satisfy a threshold, such as described herein) or does not satisfy the safety criteria a certain number of times, the process 400 may proceed to block 416.

At block 416, the system initiates (e.g., automatically, without additional user interaction) a safety response. As described herein, the safety response can include any of reducing the accuracy and/or quantity of operations performed by the monitored AI model, and/or selectively throttling, disabling, and/or permanently disabling one or more hardware components involved in running the monitored AI model. For example, the system can set compute thresholds and/or hardware restrictions, reduce the monitored AI model's parameters, remove certain weights, neurons, or layers of monitored AI model, drop network connections, curate datasets to limit the diversity or amount of input data fed to monitored AI model, inject noise into the monitored AI model, set rate limits for the monitored AI model's inference, disable certain of the monitored AI model's operations, rotate monitored AI models to reduce optimization of a single AI model, cause a decrease in clock speed, disable certain processing units, permanently disable certain processing units such as by blowing a fuse, combinations of the foregoing, and/or the like.

In various implementations, the system may decide which safety response to initiate based on the severity of the AI model's detected behavior. For example, the system may decide which safety response to initiate based on the determined sentience index value. In some examples, the system may decide which safety response to initiate based on a change, rate of change, or a change in the rate of change of the sentience index value. In some examples, the system may decide which safety response to initiate based on whether the sentience index value is changing in a certain direction.

At block 416, the system may initiate a tiered safety response, whereby the system begins with initiating a less severe safety response (such as the least severe safety response, e.g., reducing or limiting the accuracy or quantity of operations performed by the AI model) and proceeds to initiate progressively more severe safety responses (such as reducing, limiting or impeding hardware performance, or temporarily or permanently disabling hardware components) until the AI mode's capabilities are reduced to a desired level. For example, this can include initiating increasingly severe safety responses until a determined level or degree of safety and/or trustworthiness of the AI model converges to (or within a threshold range of) a desired level or degree of safety and/or trustworthiness, until a determined level or degree of risk presented by the AI model converges to (or within a threshold range of) a desired level or degree of risk, until a determined level or degree of sentience or AGI attained by the AI model converges to (or within a threshold range of) a desired level or degree of sentience or AGI, and/or until the determined sentience index value converges to (or within a threshold range of) a desired value.

The severity of a safety response may correspond to the subsequent reduction in capability (if any) of the monitored AI model. For example, a less severe safety response may reduce the capability of the monitored AI model by a smaller amount than a more severe safety response. Put another way, a more severe safety response may reduce the capability of the monitored AI model by a greater amount than a less sever safety response. In some implementations, the reduction in capability may be determined based on a difference between (i) capability of the AI model before the respective safety response was initiated and (ii) capability of the AI model subsequent to initiation of the safety response. Additionally or alternatively, in some implementations, the reduction in capability may be determined based on a difference between (i) a baseline capability of the AI model and (ii) capability of the AI model subsequent to initiation of a respective safety response. The baseline capability may include the capability of the AI model before a respective safety response is initiated, or alternatively, the capability of the AI model before any safety response is initiated.

In various implementations, the process 400, or one or more portions thereof, may be performed in an open or closed loop such that the system can continuously or periodically monitor various AI models, such as to obtain the most recent AI model processing signature. In various implementations, the system may perform process 400 in response to initiating an AI model evaluation. For example, the system may perform process 400 in response to providing the AI model with a test prompt. In some implementations, the system can perform process 400 in response to obtaining a new or updated physiological signature. In some implementations, the system may perform process 400 in response to a new type of processing signature becoming available for monitoring.

Additional Example Implementations and Details

In various implementations, the systems or devices described herein (e.g., one or more aspects of the system 102, model store 120, model(s) 122, AI model(s) 130, and/or the like) may comprise, or be implemented in, a "virtual computing environment". As used herein, the term "virtual computing environment" should be construed broadly to include, for example, computer-readable program instructions executed by one or more processors to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 5 shows a block diagram that illustrates a computer system 500 upon which various implementations and/or aspects (e.g., one or more aspects of the system 102, model store 120, model(s) 122, monitored AI model(s) 130, and/or the like) may be implemented. Multiple such computer systems 500 may be used in various implementations of the present disclosure. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors. In various implementations, the hardware processor(s) 504 can include one or more features and/or functions similar or identical to those of processor 300 shown and/or described in FIGS. 3A-3B. For example, the hardware processor(s) 504 can include capabilities for implementing or performing any of the safety mechanisms and/or tamper-resistance techniques described herein, and/or other safety mechanisms and/or tamper-resistance techniques known in the art. In various implementations, the hardware processor(s) 504 can be a type and/or implementation of the processor 300. In various implementations, the processor 300 (or one or more aspects thereof) can be comprised in whole or in part by the processor 504. In various implementations, the processor 300 (or one or more aspects thereof) can be comprised in whole or in part by the computing system 500 and can be in communication with various aspects of the computing system 500.

Computer system 500 also includes a main memory 506, such as a random-access memory (RAM), cache, and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The main memory 506 may, for example, include instructions to implement server instances, queuing modules, memory queues, storage queues, user interfaces, and/or other aspects of functionality of the present disclosure, according to various implementations.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), and/or the like, is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware, and/or program logic which in combination with the computer system causes or programs computer system 500 to be a special-purpose machine. According to one implementation, the techniques herein are performed by computer system 500 in response to processor(s) 504 executing one or more sequences of one or more computer-readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. In some examples, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds at which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

EXAMPLE CLAUSES

Examples of implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computer-implemented method for monitoring safety and/or trustworthiness of an artificial intelligence (AI) model, the method comprising, by one or more hardware computer processors executing program instructions: obtaining an AI model processing signature associated with at least one of: an output generated by a monitored AI model, or an operation of the monitored AI model, wherein the processing signature is indicative of a level of safety and/or trustworthiness of the monitored AI model; comparing the AI model processing signature to a physiological signature; based on the comparison, determining that the AI model processing signature does not satisfy a set of safety criteria; and in response to determining that the AI model processing signature does not satisfy the set of safety criteria, initiating a safety response, wherein the safety response comprises at least one of: reducing accuracy and/or quantity of operations performed by the monitored AI model, throttling one or more hardware components involved with running the monitored AI model, shutting off the one or more hardware components, or permanently disabling the one or more hardware components.

Clause 2. The computer-implemented method of Clause 1, further comprising, by the one or more hardware computer processors executing program instructions: based on the comparison, determining a value indicative of a level of safety and/or trustworthiness of the monitored AI model; and based on the value, initiating the safety response.

Clause 3. The computer-implemented method of claim 2, further comprising, by the one or more hardware computer processors executing program instructions: determining at least one of a change in the value, a rate of change in the value, or a change in the rate of change of the value.

Clause 4. The computer-implemented of any of Clauses 1-3, wherein the physiological signature comprises a human brain activity signature.

Clause 5. The computer-implemented method of any of Clauses 1-4, wherein the physiological signature relates to physiological data comprising at least one of: electroencephalography (EEG) data, functional magnetic resonance imaging (fMRI) data, magnetic resonance imaging (MRI) data, intracranial electrode data, magnetoencephalography (MEG) data, electrocorticography (ECoG) data, near-infrared spectroscopy (NIRS) data, computed tomography (CT) data, positron emission tomography (PET) data, X-ray imaging data, or calcium imaging data.

Clause 6. The computer-implemented method of any of Clauses 1-5, further comprising, by the one or more hardware computer processors executing program instructions: obtaining physiological data indicative of human brain activity; and determining a human brain activity signature based on the physiological data.

Clause 7. The computer-implemented method of any of Clauses 1-6, further comprising, by the one or more hardware computer processors executing program instructions: transforming the AI model processing signature into a representation of physiological activity; and comparing the representation of physiological activity to the physiological signature.

Clause 8. The computer-implemented method of Clause 7, further comprising, by the one or more hardware computer processors executing program instructions: applying a rule-based algorithm to the AI model processing signature to obtain the representation of physiological activity.

Clause 9. The computer-implemented method of Clause 8 further comprising, by the one or more hardware computer processors executing program instructions: generating the rule-based algorithm based on mapping processing signatures captured over time to physiological signatures captured over time.

Clause 10. The computer-implemented method of any of Clauses 7-9, further comprising, by the one or more hardware computer processors executing program instructions: transforming the AI model processing signature by using a second AI model trained to generate representations of physiological activity based on processing signatures, wherein the second AI model is different from the monitored AI model.

Clause 11. The computer-implemented method of Clause 10, wherein the second AI model is used offline.

Clause 12. The computer-implemented method of any of Clauses 1-11, wherein the AI model processing signature is obtained in response to providing a test prompt to the monitored AI model.

Clause 13. The computer-implemented method of Clause 12, where the test prompt is stored in tamper-resistant hardware or in tamper-resistant firmware such that the monitored AI model cannot read or alter the test prompt.

Clause 14. The computer-implemented method of any of Clauses 1-13, wherein the AI model processing signature comprises a software-level signature.

Clause 15. The computer-implemented method of Clause 14, wherein the software-level signature comprises at least one of: internal embeddings, attention patterns, API patterns, encodings, or memory footprints.

Clause 16. The computer-implemented method of any of Clauses 1-15, wherein the AI model processing signature comprises a hardware-level signature.

Clause 17. The computer-implemented method of Clause 16, wherein the hardware-level signature comprises at least one of: voltage levels, current levels, temperature, power consumption, core utilization, data transfers, or clock speed.

Clause 18. The computer-implemented method of any of Clauses 1-17, wherein throttling the one or more hardware components comprises reducing clock speed of at least one of the one or more hardware components.

Clause 19. The computer-implemented method of any of Clauses 1-18, wherein permanently disabling the one or more hardware components comprises blowing a fuse of at least one of the one or more hardware components.

Clause 20. The computer-implemented method of any of Clauses 1-19, further comprising, by the one or more hardware computer processors executing program instructions: transforming the physiological signature into a representation of an AI model processing signature; and comparing the AI model processing signature to the representation of an AI model processing signature.

Clause 21. The computer-implemented method of any of Clauses 1-20, further comprising, by the one or more hardware computer processors executing program instructions: configuring the set of safety criteria based on at least one of: an environment housing the monitored AI model, or a geographical location of a server hosting the monitored AI model.

Clause 22. A system comprising: one or more computer-readable storage mediums or devices comprising, configured to store, and/or storing program instructions; and one or more processors configured to execute the program instructions to cause the system to perform the computer-implemented method of any of Clauses 1-21.

Clause 23. One or more computer-readable storage mediums or devices comprising, configured to store, and/or storing program instructions, the program instructions executable by one or more processors to cause the one or more processors to perform the computer-implemented method of any of Clauses 1-21.

Clause 24. A computer-implemented method for monitoring an artificial intelligence (AI) model, the method comprising, by one or more hardware computer processors executing program instructions: capturing a sentience signature associated with at least an operation of the monitored AI model, wherein the sentience signature is indicative of at least one of: a level of risk presented by the monitored AI model, a level of sentience attained by the monitored AI model, or a level of artificial general intelligence (AGI) attained by the monitored AI model; comparing the sentience signature to a physiological signature; based on the comparison, determining at least one of: the level of risk presented by the monitored AI model, the level of sentience attained by the monitored AI model, or the level of AGI attained by the monitored AI model; and based on the determined level of risk, sentience, and/or AGI, initiating a safety response to reduce a capability of the monitored AI model.

Clause 25. The computer-implemented method of Clause 24, wherein the sentience signature comprises at least one of: a software-level processing signature of the monitored AI model, or a hardware-level processing signature of the monitored AI model.

Clause 26. The computer-implemented method of Clause 24 or Clause 25, further comprising, by the one or more hardware computer processors executing program instructions: obtaining an updated sentience signature type; capturing a second sentience signature having the updated sentience signature type; comparing the second sentience signature to the physiological signature; and determining at least one of: an updated level of risk presented by the monitored AI model, based at least in part on the comparison and a previously determined level of risk presented by the AI model; an updated level of sentience attained by the monitored AI model, based at least in part on the comparison and a previously determined level of sentence attained by the AI model; or an updated level of AGI attained by the monitored AI model, based at least in part on the comparison and a previously determined level of AGI attained by the AI model.

Clause 27. The computer-implemented method of any of Clauses 24-26, wherein initiating the safety response comprises initiating a tiered safety response.

Clause 28. The computer-implemented method of Clause 27, wherein initiating the tiered safety response comprises: at a first time, initiating a first safety response to reduce the capability of the monitored AI model by a first amount; and at a second time that is later than the first time, initiating a second safety response to reduce the capability of the monitored AI model by a second amount, wherein the second amount is greater than the first amount.

Clause 29. The computer-implemented method of Clause 28, wherein reducing the capability of the monitored AI model by the first amount comprises reducing a baseline capability of the monitored AI model by the first amount, and wherein reducing the capability of the monitored AI model by the second amount comprises reducing the baseline capability of the monitored AI model by the second amount.

Clause 30. A system comprising: one or more computer-readable storage mediums or devices comprising, configured to store, and/or storing program instructions; and one or more processors configured to execute the program instructions to cause the system to perform the computer-implemented method of any of Clauses 24-29.

Clause 31. One or more computer-readable storage mediums or devices comprising, configured to store, and/or storing program instructions, the program instructions executable by one or more processors to cause the one or more processors to perform the computer-implemented method of any of Clauses 24-29.

According to various implementations, one or more features, aspects, characteristics, implementations, details, or embodiments, of any of Clauses 1-23 may be combined or used with any of one or more features, aspects, characteristics, implementations, details, or embodiments of any of Clauses 24-31.

What is claimed is:

1. A computer-implemented method for monitoring safety and/or trustworthiness of an artificial intelligence (AI) model, the method comprising, by one or more hardware computer processors executing program instructions:

obtaining an AI model processing signature associated with at least one of: an output generated by a monitored AI model, or an operation of the monitored AI model, wherein the AI model processing signature is indicative of a level of safety and/or trustworthiness of the monitored AI model;

comparing the AI model processing signature to a physiological signature;

based on the comparison, determining that the AI model processing signature does not satisfy a set of safety criteria; and in response to determining that the AI model processing signature does not satisfy the set of safety criteria, initiating a safety response, wherein the safety response comprises at least one of:

reducing accuracy and/or quantity of operations performed by the monitored AI model, throttling one or more hardware components involved with running the monitored AI model, shutting off the one or more hardware components, or permanently disabling the one or more hardware components.

2. The computer-implemented method of claim 1, further comprising, by the one or more hardware computer processors executing program instructions:

based on the comparison, determining a value indicative of a level of safety and/or trustworthiness of the monitored AI model; and based on the value, initiating the safety response.

3. The computer-implemented method of claim 1, wherein the physiological signature comprises a human brain activity signature.

4. The computer-implemented method of claim 1, wherein the physiological signature relates to physiological data comprising at least one of: electroencephalography (EEG) data, functional magnetic resonance imaging (fMRI) data, magnetic resonance imaging (MRI) data, intracranial electrode data, magnetoencephalography (MEG) data, electrocorticography (ECoG) data, near-infrared spectroscopy (NIRS) data, computed tomography (CT) data, positron emission tomography (PET) data, X-ray imaging data, or calcium imaging data.

5. The computer-implemented method of claim 1, further comprising, by the one or more hardware computer processors executing program instructions:

transforming the AI model processing signature into a representation of a physiological signature; and comparing the representation of the physiological signature to the physiological signature.

6. The computer-implemented method of claim 5, further comprising, by the one or more hardware computer processors executing program instructions:

applying a rule-based algorithm to the AI model processing signature to obtain the representation of the physiological signature.

7. The computer-implemented method of claim 5, further comprising, by the one or more hardware computer processors executing program instructions:

transforming the AI model processing signature using a second AI model trained to generate representations of physiological signatures based on AI model processing signatures, wherein the second AI model is different from the monitored AI model.

8. The computer-implemented method of claim 7, wherein the second AI model is used offline.

9. The computer-implemented method of claim 1, wherein the AI model processing signature is obtained in response to providing a test prompt to the monitored AI model.

10. The computer-implemented method of claim 1, wherein the AI model processing signature comprises at least one of: a software-level signature, or a hardware-level signature.

11. The computer-implemented method of claim 10, wherein the software-level signature comprises at least one of: internal embeddings, attention patterns, API patterns, encodings, or memory footprints.

12. The computer-implemented method of claim 10, wherein the hardware-level signature comprises at least one of: voltage levels, current levels, temperature, power consumption, core utilization, data transfers, or clock speed.

13. The computer-implemented method of claim 1, further comprising, by the one or more hardware computer processors executing program instructions:

transforming the physiological signature into a representation of an AI model processing signature; and comparing the AI model processing signature to the representation of the AI model processing signature.

14. The computer-implemented method of claim 1, further comprising, by the one or more hardware computer processors executing program instructions:

configuring the set of safety criteria based on at least one of: an environment housing the monitored AI model, or a geographical location of a server hosting the monitored AI model.

15. A system comprising:

one or more computer-readable storage mediums or devices comprising, configured to store, and/or storing program instructions; and one or more hardware processors configured to execute the program instructions to cause the system to perform the computer-implemented method of claim 1.

16. A computer-implemented method for monitoring an artificial intelligence (AI) model, the method comprising, by one or more hardware computer processors executing program instructions:

capturing a sentience signature associated with at least an operation of the monitored AI model, wherein the sentience signature is indicative of at least one of: a level of risk presented by the monitored AI model, a level of sentience attained by the monitored AI model, or a level of artificial general intelligence (AGI) attained by the monitored AI model;

comparing the sentience signature to a physiological signature;

based on the comparison, determining at least one of: the level of risk presented by the monitored AI model, the level of sentience attained by the monitored AI model, or the level of AGI attained by the monitored AI model; and based on the determined level of risk, sentience, and/or AGI, initiating a safety response to reduce a capability of the monitored AI model.

17. The computer-implemented method of claim 16, wherein the sentience signature comprises at least one of: a software-level processing signature of the monitored AI model, or a hardware-level processing signature of the monitored AI model.

18. The computer-implemented method of claim 16, further comprising, by the one or more hardware computer processors executing program instructions:

obtaining an updated sentience signature type;

capturing a second sentience signature having the updated sentience signature type;

comparing the second sentience signature to the physiological signature; and determining at least one of:

an updated level of risk presented by the monitored AI model, based at least in part on the comparison and a previously determined level of risk presented by the monitored AI model;

an updated level of sentience attained by the monitored AI model, based at least in part on the comparison and a previously determined level of sentience attained by the monitored AI model; or an updated level of AGI attained by the monitored AI model, based at least in part on the comparison and a previously determined level of AGI attained by the monitored AI model.

19. The computer-implemented method of claim 16, wherein initiating the safety response comprises initiating a tiered safety response.

20. The computer-implemented method of claim 19, wherein initiating the tiered safety response comprises:

at a first time, initiating a first safety response to reduce the capability of the monitored AI model by a first amount; and at a second time that is later than the first time, initiating a second safety response to reduce the capability of the monitored AI model by a second amount, wherein the second amount is greater than the first amount.

21. The computer-implemented method of claim 20, wherein reducing the capability of the monitored AI model by the first amount comprises reducing a baseline capability of the monitored AI model by the first amount, and wherein reducing the capability of the monitored AI model by the second amount comprises reducing the baseline capability of the monitored AI model by the second amount.

* * * * *